United States Patent
York et al.

(10) Patent No.: US 10,545,279 B2
(45) Date of Patent: Jan. 28, 2020

(54) MODULAR LIGHT GUIDE LUMINAIRES

(71) Applicant: Quarkstar LLC, Las Vegas, NV (US)

(72) Inventors: Allan Brent York, Langley (CA); Ingo Speier, Saanichton (CA); Hans Peter Stormberg, Stolberg (DE)

(73) Assignee: Quarkstar LLC, Las Vegas, NV (US)

( * ) Notice: Subject to any disclaimer, the term of this patent is extended or adjusted under 35 U.S.C. 154(b) by 955 days.

(21) Appl. No.: 14/905,782

(22) PCT Filed: Jul. 18, 2014

(86) PCT No.: PCT/US2014/047318
§ 371 (c)(1),
(2) Date: Jan. 15, 2016

(87) PCT Pub. No.: WO2015/010101
PCT Pub. Date: Jan. 22, 2015

(65) Prior Publication Data
US 2016/0370533 A1    Dec. 22, 2016

Related U.S. Application Data

(60) Provisional application No. 62/009,811, filed on Jun. 9, 2014, provisional application No. 62/003,766, filed (Continued)

(51) Int. Cl.
*F21V 8/00* (2006.01)
*F21V 7/00* (2006.01)
(Continued)

(52) U.S. Cl.
CPC .............. *G02B 6/0051* (2013.01); *F21K 9/61* (2016.08); *F21K 9/90* (2013.01); *F21V 7/0091* (2013.01); *G02B 5/0278* (2013.01); *G02B 5/0284* (2013.01); *G02B 6/002* (2013.01); *G02B 6/0055* (2013.01); *G02B 6/0096* (2013.01); *G02B 27/30* (2013.01); *F21Y 2115/10* (2016.08)

(58) Field of Classification Search
CPC .. G02B 6/0078; G02B 6/0068; G02B 6/0076; G02B 6/008; G02B 6/0055; G02B 6/0073; G02B 6/0018; G02B 6/002
USPC .................................. 362/551–582, 600–634
See application file for complete search history.

(56) References Cited

U.S. PATENT DOCUMENTS

| | | | |
|---|---|---|---|
| 5,764,828 A | 6/1998 | Iga et al. | |
| 7,712,918 B2 * | 5/2010 | Siemiet ..................... | F21S 4/28 362/555 |

(Continued)

FOREIGN PATENT DOCUMENTS

| | | |
|---|---|---|
| DE | 102011090197 A1 | 7/2013 |
| WO | WO2012176352 A1 | 12/2012 |
| WO | WO2013023008 A1 | 2/2013 |

OTHER PUBLICATIONS

European Application No. 16 159 648.1, Communication pursuant to Article 94(3) EPC, dated Oct. 6, 2016, 5 pages.

(Continued)

*Primary Examiner* — William J Carter
(74) *Attorney, Agent, or Firm* — Fish & Richardson P.C.

(57) ABSTRACT

The present technology relates to achieving a low manufactured cost and high design alignment robustness for fabrication of modular light guide luminaires featuring solid state light-emitting elements.

20 Claims, 16 Drawing Sheets

Related U.S. Application Data on May 28, 2014, provisional application No. 61/996,814, filed on May 14, 2014, provisional application No. 61/856,009, filed on Jul. 18, 2013.

(51) Int. Cl.
| | | |
|---|---|---|
| *F21K 9/61* | (2016.01) | |
| *F21K 9/90* | (2016.01) | |
| *G02B 5/02* | (2006.01) | |
| *G02B 27/30* | (2006.01) | |
| *F21Y 115/10* | (2016.01) | |

(56) References Cited

U.S. PATENT DOCUMENTS

| | | | |
|---|---|---|---|
| 2004/0208019 A1* | 10/2004 | Koizumi | B60Q 1/0041 362/558 |
| 2005/0018147 A1 | 1/2005 | Lee et al. | |
| 2005/0259224 A1 | 11/2005 | Lee et al. | |
| 2009/0190373 A1 | 7/2009 | Bita et al. | |
| 2012/0268966 A1 | 10/2012 | McCollum | |
| 2013/0039050 A1 | 2/2013 | Dau et al. | |
| 2013/0039090 A1 | 2/2013 | Dau et al. | |

OTHER PUBLICATIONS

European Application No. 17 188 924.9, European Search Report, dated Feb. 13, 2018, 144 pages.

European Application No. 17 188 924.9, Communication pursuant to Article 94(3) EPC, dated Mar. 16, 2018, 7 pages.

Prins et al., "An inverse method for the design of TIR collimators to achieve a uniform color light beam", CASA Report 12-09, Centre for Analysis, Scientific computing and Applications, Department of Mathematics and Computer Science, Eindhoven University of Technology, ISSN: 0926-4507, Apr. 2012, 22 pages.

Notification of Tmasmittal of the International Search Report and the Written Opinion of the International Searching Authority, International Application No. PCT/US2014/047318, dated May 18, 2015, 19 pages.

\* cited by examiner

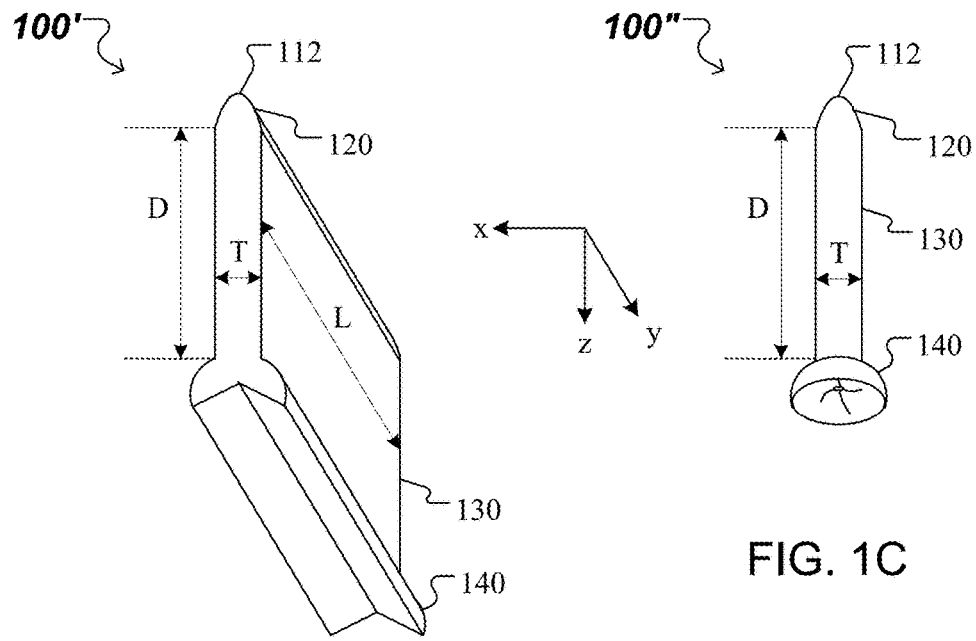
FIG. 1B
FIG. 1C
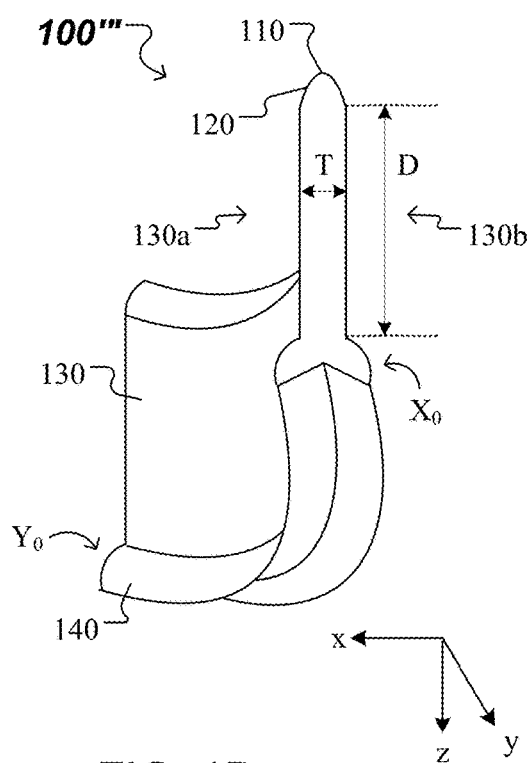
FIG. 1D
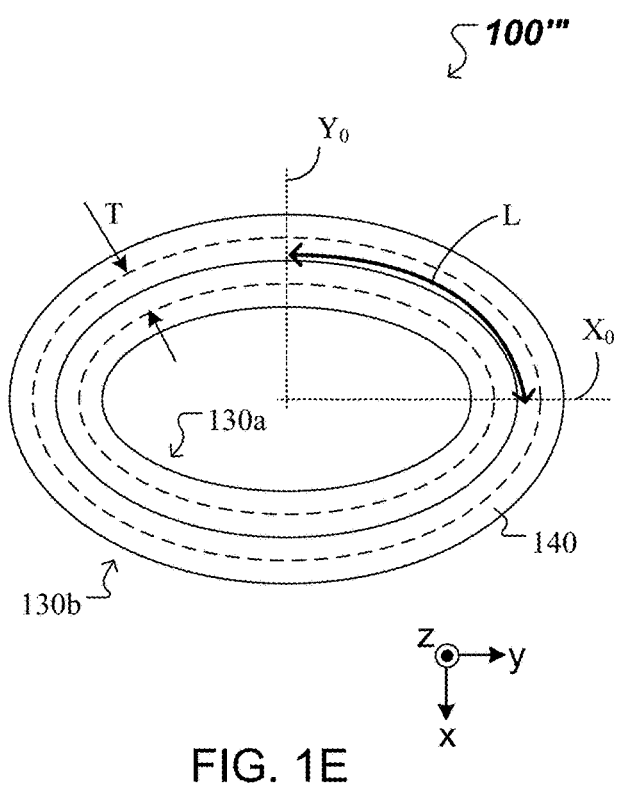
FIG. 1E

1100
FIG. 11A
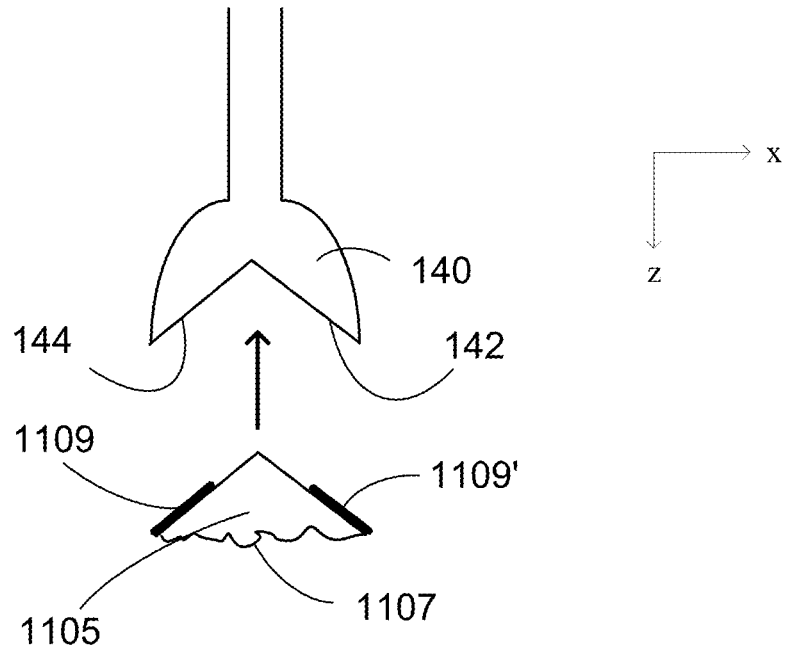
FIG. 11B
FIG. 11C
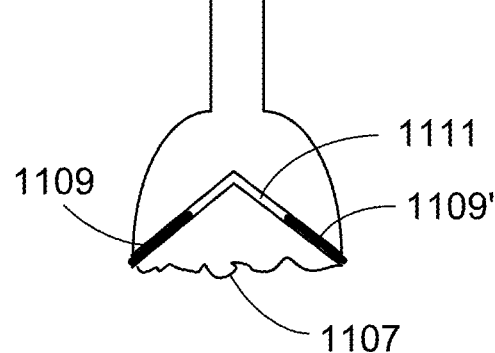

1100

MODULAR LIGHT GUIDE LUMINAIRES

CROSS-REFERENCE TO RELATED APPLICATION

This application is a U.S. National Stage of International Application No. PCT/US2014/047318, filed Jul. 18, 2014, which claims benefit under 35 U.S.C. § 119(e)(1) to U.S. Provisional Application No. 61/856,009, filed on Jul. 18, 2013, U.S. Provisional Application No. 61/996,814, filed on May 14, 2014, U.S. Provisional Application No. 62/003,766, filed May 28, 2014, and U.S. Provisional Application No. 62/009,811, filed on Jun. 9, 2014 the entire contents of which are incorporated by reference herein.

TECHNICAL FIELD

Technologies for the fabrication of modular light guide luminaires to achieve a low manufactured cost of the luminaire and high design alignment robustness are described herein.

BACKGROUND

Generally, lighting systems in the lighting field conventionally harness fairly spatially homogeneous light sources within optical systems. These light sources are often very bright (source luminance.) These conventional lighting systems are often provided with a single reflector system to collect the light flux or a secondary reflector, or diffuser system, to direct the light flux towards a target area. In many cases, the conventional lighting systems provide a lambertian diffuser or a reflective surface in the system that allow a direct view of the lambertian light source. Such lighting systems may, at certain angles, cause glare, particularly with bright Light Emitting Diode (LED) light sources.

SUMMARY

The present technology relates generally to achieving a low manufactured cost and high design alignment robustness for fabrication of modular light guide luminaires featuring solid state light-emitting elements.

A variety of luminaires (also referred to as luminaire modules) are disclosed that are configured to manipulate light provided by one or more light-emitting elements (LEEs). In general, embodiments of the luminaires feature one or more optical couplers (e.g., parabolic reflectors) that redirect light emitted from the LEEs to an optical extractor which then directs the light into a range of angles. In certain embodiments, the luminaire includes a light guide that guides light from the optical coupler to the optical extractor. The components of the luminaire can be configured in a variety of ways so a variety of intensity distributions can be output by the luminaire. Such luminaires can be configured to provide light for particular lighting applications, including office lighting, task lighting, cabinet lighting, garage lighting, wall wash, stack lighting, and down-lighting.

Accordingly, various aspects of the invention are summarized as follows.

In general, in a first aspect, the invention features a luminaire module including one or more light-emitting elements (LEEs) disposed on one or more substrates and adapted to emit light in a forward direction; a light guide including an input end and an output end, and side surfaces extending from the input end to the output end, the side surfaces shaped to guide light emitted by the one or more LEEs and received at the input end of the light guide in the forward direction to the output end of the light guide and provide guided light at the output end of the light guide; and an optical extractor optically coupled with the output end of the light guide and adapted to receive the guided light, the optical extractor having a first redirecting surface and one or more output surfaces, the first redirecting surface of the optical extractor being adapted to reflect at least a portion of the light received at the optical extractor in a first direction that has a component orthogonal to the forward direction, wherein at least one of the first redirecting surface or at least one of the one or more output surfaces diffuse light.

The foregoing and other embodiments can each optionally include one or more of the following features, alone or in combination. In some implementations, the light guide can include a solid transparent material and the side surfaces can be configured to guide the light via TIR. In some implementations, the light guide can be hollow and the side surfaces can be reflectors configured to guide the light via specular reflection. In some implementations, the luminaire module can further include one or more couplers positioned to receive a portion of the light emitted by corresponding one or more LEEs and adapted to at least partially collimate the received portion of the light, the one or more couplers can be adjacent to the input end of the light guide.

In some implementations, the optical extractor can include a second redirecting surface, the second redirecting surface of the optical extractor can be adapted to reflect at least a portion of the light received at the optical extractor in a second direction that has a component orthogonal to the forward direction and antiparallel to the orthogonal component of the first direction. In some implementations, at least one of the first redirecting surface, the second redirecting surface, or at least one of the one or more output surfaces can include a diffusive film. In some implementations, the diffusive film can be reflective. In some implementations, the diffusive film can be transmissive. In some implementations, at least one of the first redirecting surface, the second redirecting surface, or at least one of the one or more output surfaces can include diffusive structures. In some implementations, the diffusive structures can include facets. In some implementations, the diffusive structures can include indentations. In some implementations, the diffusive structures can include undulating features. In some implementations, the diffusive structures can be two dimensional within at least one of the first redirecting surface, the second redirecting surface, or at least one of the one or more output surfaces.

In some implementations, the diffusive surfaces can have translational symmetry of at least one of the first redirecting surface, the second redirecting surface, or at least one of the one or more output surfaces. In some implementations, at least one of the first redirecting surface, the second redirecting surface, or at least one of the one or more output surfaces can further include a reflective coating. In some implementations, the luminaire module can further include one or more reflectors disposed on at least a portion of at least one of the first or the second redirecting surface of the optical extractor. In some implementations, the luminaire module can further include a cap coupled to the optical extractor such that light that is output through at least one of the first or the second redirecting surface is received at an input surface of the cap. In some implementations, the cap can include a diffusive light output surface.

In general, in a further aspect, the invention features a method of fabricating an optical extractor including providing an optical extractor having smooth surfaces corresponding to at least one of the first redirecting surface, the second redirecting surface, or at least one of the one or more output surfaces; and generating the diffusive structures on at least one of the smooth surfaces.

The foregoing and other embodiments can each optionally include one or more of the following features, alone or in combination. In some implementations, generating the diffuse structures can include embossing the diffusive structures. In some implementations, generating the diffuse structure can include molding the diffusive structures. In some implementations, generating the diffuse structure can include imprinting the diffusive structures.

In general, in a further aspect, the invention features a method of fabricating an optical extractor including disposing a diffusive film on at least one of the first redirecting surface, the second redirecting surface, or at least one of the one or more output surfaces.

In general, in a further aspect, the invention features a luminaire module including one or more light-emitting elements (LEEs) disposed on one or more substrates and adapted to emit light in a forward direction; a light guide comprising an input end and an output end, and side surfaces extending from the input end to the output end, the side surfaces shaped to guide light, emitted by the one or more LEEs and received at the input end of the light guide, in the forward direction to the output end of the light guide and provide guided light at the output end of the light guide; an optical extractor optically coupled with the output end of the light guide and adapted to receive the guided light, the optical extractor having a first redirecting surface, the first redirecting surface of the optical extractor being adapted to reflect at least a portion of the light received at the optical extractor in a first direction that has a component orthogonal to the forward direction; and an optical insert coupled with the first redirecting surface, the optical insert adapted to receive at least a portion of light from the light guide at one or more light input surfaces of the optical insert.

The foregoing and other embodiments can each optionally include one or more of the following features, alone or in combination. In some implementations, the optical insert can include one or more output surfaces. In some implementations, at least one of the one or more output surfaces of the optical insert can be diffusive. In some implementations, at least a portion of the diffusive output surfaces of the optical insert can be reflective. In some implementations, at least a portion of the diffusive output surfaces of the optical insert can be transmissive. In some implementations, the light guide can include a solid transparent material and the side surfaces are configured to guide the light via TIR. In some implementations, the light guide can be hollow and the side surfaces are reflectors configured to guide the light via specular reflection.

In some implementations, the luminaire module can further include one or more couplers positioned to receive a portion of the light emitted by corresponding one or more LEEs and adapted to at least partially collimate the received portion of the light, the one or more couplers can be adjacent to the input end of the light guide. In some implementations, the optical extractor can include a second redirecting surface, the second redirecting surface of the optical extractor can be adapted to reflect at least a portion of the light received at the optical extractor in a second direction that has a component orthogonal to the forward direction and antiparallel to the orthogonal component of the first direction.

In some implementations, the luminaire module can further include one or more reflectors, where the one or more reflectors can be coupled with at least a portion of at least one of the one or more light input surfaces of the optical insert. In some implementations, the luminaire module can further include one or more reflectors, where the one or more reflectors can be coupled with at least a portion of at least one of the first or the second redirecting surface of the optical extractor. In some implementations, the optical insert and the optical extractor can form an enclosure adjacent to at least one of the first or the second redirecting surface of the optical extractor.

In general, in a further aspect, the invention features an illumination device including a light source configured to emit light having an anisotropic spectral power distribution; and an optical coupler having an input aperture and an exit aperture, the input aperture optically coupled with the light source, the optical coupler having a diffusive side surface disposed between the input and exit apertures, the side surface configured to reflect incident light having a first divergence into reflected light having a second divergence being larger than the first divergence.

The foregoing and other embodiments can each optionally include one or more of the following features, alone or in combination. In some implementations, the side surface can be configured such that reflected light directly reaches the exit aperture. In some implementations, the light source can includes a pump light-emitting element (LEE) emitting light of a first wavelength in a first angular range and a phosphor converting at least a portion of the emitted light of the first wavelength to light of a second wavelength, wherein the converted light can be emitted in a second angular range, and wherein a divergence of the first angular range can be larger than a divergence of the second angular range, and the optical coupler can be configured to receive the light of the first wavelength in the first angular range and the light of the second wavelength in the second angular range, the side surface can include a first portion with diffuse properties, the first portion of the side surface can be configured to mix the received light of the first wavelength and the received light of the second wavelength, and to redirect the mixed light in a single third angular range, wherein the redirected mixed light can be output through an output aperture of the optical coupler.

In some implementations, the side surface comprises a second portion that redirects light impinging thereon by specular reflection. In some implementations, the first portion with diffuse properties of the optical coupler can be adjacent to the light source. In some implementations, the pump LEE can include a blue LED and the first wavelength can correspond to blue light. In some implementations, the second wavelength can correspond to yellow light. In some implementations, the illumination device can further include a light guide, where the light guide can include an input end and an output end, the input end of the light guide can be coupled with the output aperture of the optical coupler; and side surfaces extending from the input end to the output end, the side surfaces can be shaped to guide light received from the optical coupler in a forward direction to the output end of the light guide and provide guided light at the output end of the light guide.

In general, in a further aspect, the invention features a luminaire module including one or more light-emitting elements (LEEs) disposed on one or more substrates and adapted to emit light in a forward direction; a light guide including an input and an output end, and side surfaces extending from the input end to the output end, the light guide embedding the one or more LEEs, wherein the side surfaces are shaped to guide light emitted by the one or more LEEs in the forward direction to the output end of the light guide and provide guided light at the output end of the light guide; and an optical extractor optically coupled with the output end of the light guide and adapted to receive the guided light, the optical extractor having a first redirecting surface, the first redirecting surface of the optical extractor being adapted to reflect at least a portion of the light received at the optical extractor in a first direction that has a component orthogonal to the forward direction.

The foregoing and other embodiments can each optionally include one or more of the following features, alone or in combination. In some implementations, the light guide can include a solid transparent material and the side surfaces can be configured to guide the light via TIR. In some implementations, the light guide can be hollow and the side surfaces are reflectors configured to guide the light via specular reflection. In some implementations, the luminaire module can further include one or more couplers positioned to receive a portion of the light emitted by corresponding one or more LEEs and adapted to at least partially collimate the received portion of the light, the one or more couplers can be embedded into the light guide adjacent to the input end of the light guide.

In some implementations, the optical extractor can include a second redirecting surface, the second redirecting surface of the optical extractor can be adapted to reflect at least a portion of the light received at the optical extractor in a second direction that has a component orthogonal to the forward direction and antiparallel to the orthogonal component of the first direction. In some implementations, at least one of the first and second directions can have a component that is antiparallel to the forward direction. In some implementations, the optical extractor can include one or more output surfaces, and the optical extractor can direct at least a portion of the light received from the light guide towards the one or more output surfaces of the optical extractor. In some implementations, at least one of the first or the second redirecting surface of the optical extractor can be at least partially reflective for light received from the light guide. In some implementations, at least one of the first or the second redirecting surface of the optical extractor can be partially transmissive for the light received from the light guide. In some implementations, at least one of the first or the second redirecting surface of the optical extractor can reflect substantially all of the light received from the light guide.

In general, in a further aspect, the invention features a luminaire module including one or more light-emitting elements (LEEs) disposed on one or more substrates and adapted to emit light in a forward direction; a light guide including an input end and an output end, and side surfaces extending from the input end to the output end, the side surfaces shaped to guide light emitted by the one or more LEEs and received at the input end of the light guide in the forward direction to the output end of the light guide and provide guided light at the output end of the light guide; a protective material disposed adjacent to at least a portion of at least one of the side surfaces of the light guide; and an optical extractor optically coupled with the output end of the light guide and adapted to receive the guided light, the optical extractor having a first redirecting surface, the first redirecting surface of the optical extractor can be adapted to reflect at least a portion of the light received at the optical extractor in a first direction that has a component orthogonal to the forward direction.

The foregoing and other embodiments can each optionally include one or more of the following features, alone or in combination. In some implementations, the light guide can guide light via TIR, and the protective material can be spaced apart from the light guide. In some implementations, the light guide can be hollow and guide light via specular reflection off the side surfaces and the protective material can, at least partially, cover the at least one of the side surfaces. In some implementations, the protective material can form a shroud. In some implementations, the protective material can form a pattern to create a desired illumination distribution. In some implementations, the protective material can create a translucent effect. In some implementations, the light guide can include a solid transparent material and the side surfaces can be configured to guide the light via TIR. In some implementations, the light guide can be hollow and the side surfaces can be reflectors configured to guide the light via specular reflection.

In some implementations, the luminaire module can further include one or more couplers positioned to receive a portion of the light emitted by corresponding one or more LEEs and adapted to at least partially collimate the received portion of the light, the one or more couplers can be adjacent to the input end of the light guide. In some implementations, the optical extractor can include a second redirecting surface, the second redirecting surface of the optical extractor can be adapted to reflect at least a portion of the light received at the optical extractor in a second direction that has a component orthogonal to the forward direction and antiparallel to the orthogonal component of the first direction.

In general, in a further aspect, the invention features a method for fabricating a modular luminaire including bonding multiple light-emitting elements (LEEs) to one or more substrate; molding optical couplers to the bonded LEEs, wherein each optical coupler is registered to one or more corresponding LEEs of the multiple LEEs, such that the couplers molded to the LEEs form a coupler assembly; and optically bonding the coupler assembly to an application component comprising a light guide and an optical extractor to generate the modular luminaire.

The foregoing and other embodiments can each optionally include one or more of the following features, alone or in combination. In some implementations, the light guide and the extractor of the application component can be configured such that the generated modular luminaire provides light in two angular ranges that are symmetric with respect to an optical axis of the light guide. In some implementations, the light guide and the extractor of the application component can be configured such that the generated modular luminaire provides light in two angular ranges that are asymmetric with respect to an optical axis of the light guide. In some implementations, the light guide and the extractor of the application component can be configured such that the generated modular luminaire provides light in a single angular range.

In some implementations, the method further includes forming multiple coupler assemblies; and prior to bonding the multiple coupler assemblies to the application component, disposing the multiple coupler assemblies along a first direction along the application component such that adjacent coupler assemblies are spaced apart from each other. In some implementations, the light guide of the application component can include an input end and an output end, and side surfaces extending from the input end to the output end, the side surfaces can be shaped to guide light emitted by the plurality of LEEs and received at the input end of the light guide in a forward direction to the output end of the light guide and provide guided light at the output end of the light guide, and an optical extractor optically coupled with the output end of the light guide and adapted to receive the guided light, the optical extractor can have a first redirecting surface and one or more output surfaces, the first redirecting surface of the optical extractor can be adapted to reflect at least a portion of the light received at the optical extractor in a first direction that has a component orthogonal to the forward direction. In some implementations, at least some LEEs of the multiple LEEs can be white light LEDs. In some implementations, the optical bonding can form a removable coupling between the coupler assembly and the application component.

The details of one or more implementations of the technologies described herein are set forth in the accompanying drawings and the description below. Other features, aspects, and advantages of the disclosed technologies will become apparent from the description, the drawings, and the claims.

BRIEF DESCRIPTION OF THE DRAWINGS

FIG. 1B is perspective view of another example of an elongated luminaire module with a light guide and an optical extractor.

FIG. 1C is a perspective view of an example of a rotationally symmetric luminaire module with a light guide and a bidirectional optical extractor.

FIGS. 1D-1E are views of an example of an elongated luminaire module with curved light guide and bidirectional optical extractor.

FIGS. 11A-13C show examples of optical extractors with optical inserts.

Reference numbers and designations in the various drawings indicate exemplary aspects of implementations of particular features of the present disclosure.

DETAILED DESCRIPTION

The technologies disclosed herein can be implemented as solid-state luminaires. Lighting systems based on the disclosed virtual filaments can create functional characteristics, such as alternative ways to assemble such lighting systems that can support greater efficacy, spatial control and manufacturing economics. For example, nominally 2π steradian, roughly lambertian functionalized LED dies or packages can be combined with phosphor conversion coatings or plates in the packaging to provide an optical structure that transfers light flux to a point of the optical structure that is remote from the LED sources. The light flux can then be extracted and shaped in accordance with the needs of the system and end user application, for example.

The technologies described herein can provide greater spatial and spectral functionality in a space illuminated by a lighting system. Alternative technologies to assemble lighting systems achieving low manufactured cost and high design alignment robustness are described herein. These technologies can provide highly functional lighting capability and options in a low cost manufactured platform that minimalizes the physical footprint of lighting systems.

Prior to describing the above-noted technologies, light guide luminaire modules are described first.

(i) Light Guide Luminaire Modules

Figure 1A:
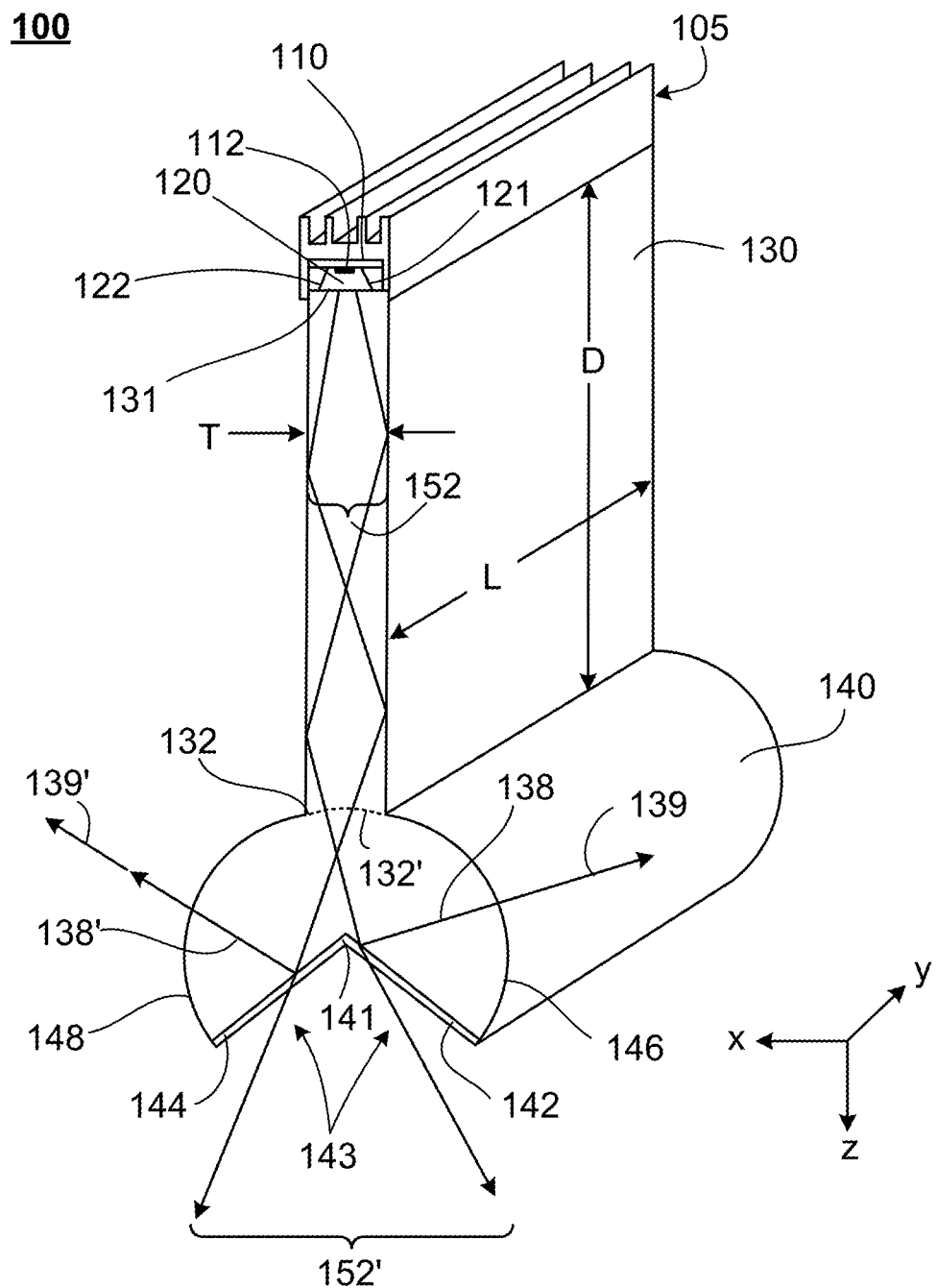
FIG. 1A is a perspective view of an example of an elongated luminaire module with a light guide and a bidirectional optical extractor.

Referring to FIG. 1A, in which a Cartesian coordinate system is shown for reference, an embodiment of a luminaire module 100 includes a substrate 110 having a plurality of LEEs 112 distributed along the substrate 110. The LEEs 112 are disposed at an upper edge 131 of a light guide 130. As shorthand, the positive z-direction is referred to herein as the "forward" direction and the negative z-direction is the "backward" direction. Sections through the luminaire parallel to the x-z plane are referred to as the "cross-section" or "cross-sectional plane" of the luminaire module. Also, luminaire module 100 extends along the y-direction, so this direction is referred to as the "longitudinal" direction of the luminaire module. Lastly, embodiments of luminaire modules can have a plane of symmetry parallel to the y-z plane, be curved or otherwise shaped. Depending on the embodiment, one or more components of the luminaire module can be invariant or variant under translation along the y-axis. This is referred to as the "symmetry plane" of the luminaire module.

Multiple LEEs 112 are disposed on the substrate 110, although only one of the multiple LEEs 112 is shown in FIG. 1A. For example, the plurality of LEEs 112 can include multiple white LEDs. An optical extractor 140 is disposed at lower edge of light guide 132. The LEEs 112 are coupled with one or more optical couplers 120 (only one of which is shown in FIG. 1A).

Substrate 110, light guide 130, and optical extractor 140 extend a length L along the y-direction. Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, 150 cm or more).

The number of LEEs 112 on the substrate 110 will generally depend, inter alia, on the length L, where more LEEs are used for longer luminaires. In some embodiments, the plurality of LEEs 112 can include between 10 and 1,000 LEEs (e.g., about 50 LEEs, about 100 LEEs, about 200 LEEs, about 500 LEEs). Generally, the density of LEEs (e.g., number of LEEs per unit length) will also depend on the nominal power of the LEEs and illuminance desired from the luminaire module. For example, a relatively high density of LEEs can be used in applications where high illuminance is desired or where low power LEEs are used. In some embodiments, the luminaire module has an LEE density along its length of 0.1 LEE per centimeter or more (e.g., 0.2 per centimeter or more, 0.5 per centimeter or more, 1 per centimeter or more, 2 per centimeter or more). The density of LEEs may also be based on a desired amount of mixing of light emitted by the multiple LEEs. In embodiments, LEEs can be evenly spaced along the length, L, of the luminaire. In some implementations, a heat-sink 105 can be attached to the substrate 110 to extract heat emitted by the plurality of LEEs 112. The heat-sink 105 can be disposed on a surface of the substrate 110 opposing the side of the substrate 110 on which the LEEs 112 are disposed.

Optical coupler 120 includes one or more solid pieces of transparent material (e.g., glass or a transparent organic plastic, such as polycarbonate or acrylic) having surfaces 121 and 122 positioned to reflect light from the LEEs 112 towards light guide 130. In general, surfaces 121 and 122 are shaped to collect and collimate light emitted from the LEEs. In the x-z cross-sectional plane, surfaces 121 and 122 can be straight or curved. Examples of curved surfaces include surfaces having a constant radius of curvature, parabolic or hyperbolic shapes. In some embodiments, surfaces 121 and 122 are coated with a highly reflective material (e.g., a reflective metal, such as aluminum), to provide a highly reflective optical interface. The cross-sectional profile of optical coupler 120 can be uniform along the length L of luminaire module 100. Alternatively, the cross-sectional profile can vary. For example, surfaces 121 and/or 122 can be curved out of the x-z plane.

The exit aperture of the optical coupler 120 and the adjacent upper edge of light guide 131 are optically coupled. For example, the surfaces of a solid optical coupler and a solid light guide can be attached using a material that substantially matches the refractive index of the material forming the optical coupler 120 or light guide 130 or both. The optical coupler 120 can be affixed to light guide 130 using an index matching fluid, grease, or adhesive. In some embodiments, optical coupler 120 is fused to light guide 130 or they are integrally formed from a single piece of material.

Light guide 130 is formed from a piece of transparent material (e.g., glass or a transparent organic plastic, such as polycarbonate or acrylic) that can be the same or different from the material forming optical couplers 120. Light guide 130 extends length L in the y-direction, has a thickness uniform T in the x-direction, and a uniform depth D in the z-direction. The dimensions D and T are generally selected based on the desired optical properties of the light guide. During operation, light coupled into the light guide from optical coupler 120 (depicted by angular range 152) reflects off the planar surfaces of the light guide by TIR and mixes within the light guide. The mixing can help achieve illuminance and/or color uniformity at the distal portion of the light guide 132 at optical extractor 140. The depth, D, of light guide 130 can be selected to achieve adequate uniformity at the exit aperture (i.e., at end 132) of the light guide. In some embodiments, D is in a range from about 1 cm to about 20 cm (e.g., 2 cm or more, 4 cm or more, 6 cm or more, 8 cm or more, 10 cm or more, 12 cm or more).

In general, optical couplers 120 are designed to restrict the angular range of light entering the light guide 130 (e.g., to within +/−40 degrees) so that at least a substantial amount of the light is coupled into spatial modes in the light guide 130 that undergoes TIR at the planar surfaces. Light guide 130 has a uniform thickness T, which is the distance separating two planar opposing surfaces of the light guide. Generally, T is sufficiently large so the light guide has an aperture at upper surface 131 sufficiently large to approximately match (or exceed) the exit aperture of optical coupler 120. In some embodiments, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the embodiment, the narrower the light guide the better it may mix light. A narrow light guide also provides a narrow exit aperture. As such light emitted from the light guide can be considered to resemble the light emitted from a one-dimensional linear light source, also referred to as an elongate virtual filament.

As discussed previously, length L corresponds to the length of the luminaire and can vary as desired.

While optical coupler 120 and light guide 130 are formed from solid pieces of transparent material, hollow structures are also possible. For example, the optical coupler 120 or the light guide 130 or both may be hollow with reflective inner surfaces rather than being solid. As such material cost can be reduced and absorption in the light guide avoided. A number of specular reflective materials may be suitable for this purpose including materials such as 3M Vikuiti™ or Miro IV™ sheet from Alanod Corporation where greater than 90% of the incident light would be efficiently guided to the optical extractor. Optical extractor 140 is also composed of a solid piece of transparent material (e.g., glass or a transparent organic plastic, such as polycarbonate or acrylic) that can be the same as or different from the material forming light guide 130. The optical extractor 140 includes surfaces 142 and 144 and curved surfaces 146 and 148. The surfaces 142 and 144 represent first and second portions of a redirecting surface 143, while the curved surfaces 146 and 148 represent first and second output surfaces of the luminaire module 100.

Surfaces 142 and 144 of luminaire module 100 can be flat and coated with a reflective material (e.g., a highly reflective metal, such as aluminum or silver) over which a protective coating may be disposed. Furthermore, a material with reflectivity properties that can be controlled during operation, for example an electrochromic, electrowetting, liquid crystal or other mirror layer, may be employed. Thus, surfaces 142 and 144 provide a highly reflective optical interface for light entering an input end 132' of the optical extractor 140 from light guide 130. As another example, the surfaces 142 and 144 can include portions that are transparent to the light entering the optical extractor 140 at the input end 132'. Here, these portions can be uncoated regions (e.g., partially silvered regions) or discontinuities (e.g., slots, slits, apertures) of the surfaces 142 and 144. As such, some light can be transmitted in the forward direction (along the z-axis) through surfaces 142 and 144 of the optical extractor 140 in an output angular range 152'. In some cases, the light transmitted in the output angular range 152' is refracted. In this way, the redirecting surface 143 acts as a beam splitter rather than a mirror, and transmits in the output angular range 152' a desired portion of incident light, while reflecting the remaining light in angular ranges 138 and 138'.

In the x-z cross-sectional plane, the lines corresponding to surfaces 142 and 144 have the same length and form a v-shape that meets at a vertex 141. In general, the included angle of the v-shape can vary as desired. For example, in some embodiments, the included angle can be relatively small (e.g., from 30° to 60°). In certain embodiments, the included angle is in a range from 60° to 120° (e.g., about 90°). The included angle can also be relatively large (e.g., in a range from 120° to 150° or more). In the example implementation shown in FIG. 1A, the output surfaces 146 and 148 of the optical extractor 140 are curved with a constant radius of curvature that is the same for both. Accordingly, luminaire module 100 has a plane of symmetry intersecting vertex 141 parallel to the y-z plane.

The surface of optical extractor 140 adjacent to the lower edge 132 of light guide 130 is optically coupled to edge 132. For example, optical extractor 140 can be affixed to light guide 130 using an index matching fluid, grease, or adhesive. In some embodiments, optical extractor 140 is fused to light guide 130 or they are integrally formed from a single piece of material.

During operation, light exiting light guide 130 through end 132 impinges on the reflective interfaces at portions of the redirecting surface 142 and 144 and is reflected outwardly towards output surfaces 146 and 148, respectively, away from the symmetry plane of the luminaire. The first portion of the redirecting surface 142 provides light having an angular distribution 138 towards the output surface 146, the second portion of the redirecting surface 144 provides light having an angular distribution 138' towards the output surface 146. The light exits optical extractor 140 through output surfaces 146 and 148. In general, the output surfaces 146 and 148 have optical power, to redirect the light exiting the optical extractor 140 in angular ranges 139 and 139', respectively. For example, optical extractor 140 may be configured to emit light upwards (i.e., towards the plane intersecting the LEEs and parallel to the x-y plane), downwards (i.e., away from that plane) or both upwards and downwards. In general, the direction of light exiting the luminaire through surfaces 146 and 148 depends on the divergence of the light exiting light guide 130 and the orientation of surfaces 142 and 144.

Surfaces 142 and 144 may be oriented so that little or no light from light guide 130 is output by optical extractor 140 in directions that are within a certain angle of the forward direction (i.e., in certain angular ranges relative to the positive z-direction). In embodiments where the luminaire module 100 is attached to a ceiling so that the forward direction is towards the floor, such configurations can help avoid glare and an appearance of non-uniform illuminance.

In general, the intensity profile of luminaire module 100 will depend on the configuration of the optical coupler 120, the light guide 130 and the optical extractor 140. For instance, the interplay between the shape of the optical coupler 120, the shape of the redirecting surface 143 of the optical extractor 140 and the shapes of the output surfaces 146, 148 of the optical extractor 140 can be used to control the angular width and prevalent direction (orientation) of the illumination.

In some implementations, the orientation of the illumination can be adjusted based on the included angle of the v-shaped groove 141 formed by the portions of the redirecting surface 142 and 144. In this manner, light can be extracted from the luminaire module 100 in a more forward direction for the smaller of two included angles formed by the portions of the redirecting surface 142, 144.

Furthermore, while surfaces 142 and 144 are depicted as planar surfaces, other shapes are also possible. For example, these surfaces can be curved or faceted. Curved redirecting surfaces 142 and 144 can be used to narrow or widen the beam. Depending on the divergence of the angular range of the light that is received at the input end 132' of the optical extractor 140, concave reflective surfaces 142, 144 can narrow the illumination output by the optical extractor 140, while convex reflective surfaces 142, 144 can widen the illumination output by the optical extractor 140. As such, suitably configured redirecting surfaces 142, 144 may introduce convergence or divergence into the light. Such surfaces can have a constant radius of curvature, can be parabolic, hyperbolic, or have some other curvature.

FIG. 1B shows an embodiment 100' of the disclosed luminaire module that is elongated along an axis (e.g., y-axis) perpendicular to the forward direction (e.g., along the z-axis.) In this case, a length L of the light guide 130 along the elongate dimension of the luminaire module 100' can be 2', 4' or 8', for instance. A thickness T of the light guide 130 orthogonal to the elongated dimension L (e.g., along the x-axis) is chosen to be a fraction of the distance D traveled by the guided light from the receiving end to the opposing end of the light guide 130. For T=0.05 D, 0.1 D or 0.2 D, for instance, light from multiple, point-like LEEs 112—distributed along the elongated dimension L—that is edge-coupled into the light guide 130 at the receiving end can efficiently mix by the time it propagates to the opposing end.

FIG. 1C shows an embodiment 100" of the disclosed luminaire module that has a (e.g., continuous or discrete) rotational symmetry about the forward direction (e.g., z-axis.) Here, a diameter T of the light guide 130 is a fraction of the distance D traveled by the guided light from the receiving end to the opposing end of the light guide 130. For example, the diameter of the light guide 130 can be T=0.05 D, 0.1 D or 0.2 D, for instance.

Other shapes of the disclosed luminaire module are possible. FIGS. 1D and 1E show a perspective view and a bottom view, respectively, of an embodiment 100''' of the disclosed luminaire module for which the light guide 130 has two opposing side surfaces 130a, 130b that form a closed cylinder shell of thickness T. In the example illustrated in FIGS. 1D and 1E, the x-y cross-section of the cylinder shell formed by the opposing side surfaces 130a, 130b is oval. In other cases, the x-y cross-section of the cylinder shell can be circular or can have other shapes. Some implementations of the example luminaire module 100''' may include a specular reflective coating on the side surface 130a of the light guide 130. Open curved shapes are possible.

The luminaire modules described herein can be manufactured using a variety of techniques, some of which are described below.

(ii) Techniques for Manufacturing Modular Luminaire Modules

Manufacturing of luminaire modules, including the disposition of LEE dies or packages, can be facilitated by employing circuit board assembly techniques and placement machinery processes in combination with one or more processes as described herein. LEE dies or packages can be disposed relative to the optical couplers with predetermined accuracy, for example during manufacture, assembly, and installation in the field or other event. Differential coefficients of thermal expansion between different materials can be considered during such deposition, for example, if components are manufactured or assembled at different temperatures.

Figure 1F:
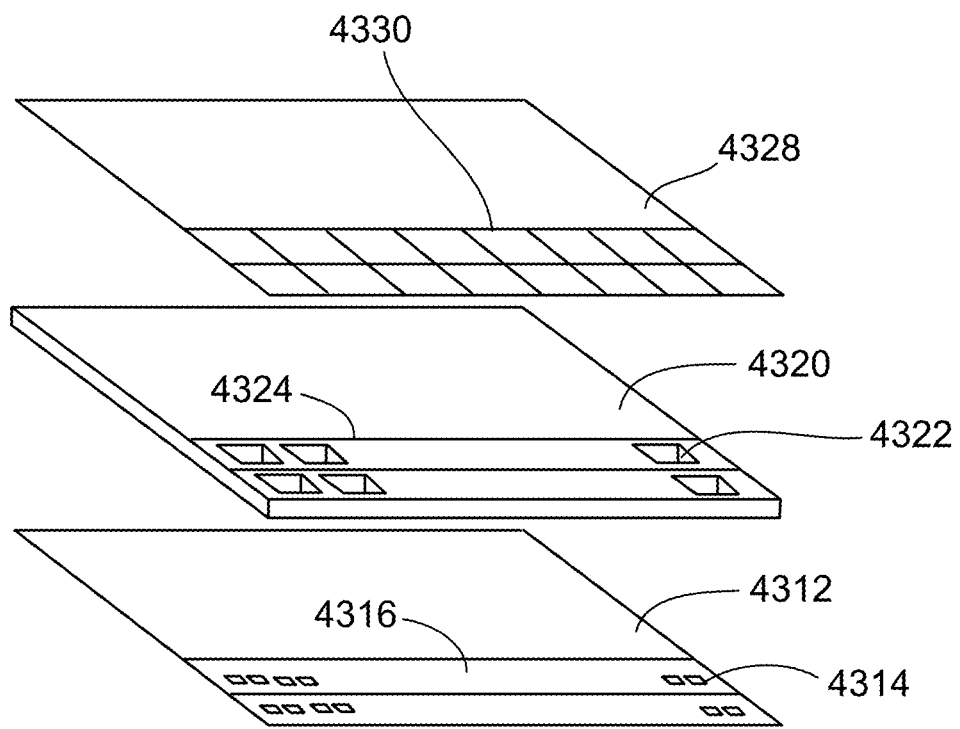
FIG. 1F shows an example of components used for forming LEE strips for a luminaire module.

For example, FIG. 1F shows how LEE strips can be formed. Three layers 4312, 4320 and 4328 are combined into sheets with suitably interconnected LEEs that can then be separated, also referred to as singulation, into LEE strips. A substrate 4312 including a printed circuit board (PCB) panel, or other suitable support layer can be configured to provide predetermined electrical, mechanical and thermal properties and interconnect functionalities. The substrate includes pairs of metal pads 4314 for each LEE chip and a suitable conductive interconnect systems for interconnecting the LEEs of a strip in a combination of series and parallel circuitry to be driven by a power supply. The power supply for each LEE strip or combination of LEE strips can be mounted on the substrate 4312 or can be a separate module connected to the strip or strips by a suitable connector. Depending on the embodiment, the substrate 4312 can include a metal core, epoxy or other PCB that can provide predetermined vertical and horizontal heat dissipation characteristics. Segmentation lines 4316 are shown where the substrate 4312 will be singulated to form the strips.

Optical couplers can be disposed in an optical coupler sheet 4320, which can be a molded sheet, such as plastic, forming an array of optical couplers 4322. The sheet 4320 can be coated with a reflective film. Segmentation lines 4324 are shown. Each LEE is positioned in an optical coupler 4322 to ensure light is effectively output from the optical coupler. The optical couplers 4322 may include one or more optical elements including non-imaging dielectric TIR concentrators, such as CPC (compound parabolic concentrators), CECs (compound elliptical concentrators), CHC (compound hyperbolic concentrators), tapered, or untapered, light pipes, segmented concentrators, other geometry concentrators, one or more lenses or other optical elements, for example.

Depending on the embodiment, the optical couplers 4322 can be nominally equal or have different configurations. Optical couplers can have different profiles in the direction of the luminaire and/or perpendicular to the luminaire. For example, the optical couplers 4322 can be rotationally symmetric, or have elliptical triangular, square, hexagonal, or multi-segment cross-sections perpendicular to the beam direction.

The optical couplers 4322 can be integrally formed or configured from solid transparent material and solely rely on TIR or can be partially or fully reflectively coated on one or more surfaces. Optical couplers also can be hollow, or reflectively coated and/or non-imaging. Hollow reflectors can have the benefit of a shortened length over a dielectric collimating optic for the same collimation angle.

If corresponding LEEs are employed in the luminaire, a phosphor sheet 4328 can be used to convert blue or ultraviolet pump light and produce white light in combination with the unconverted pump light, if any. The characteristics of the phosphor sheet 4328 can be varied depending on the peak wavelength of the LEEs, the desired correlated color temperature (CCT) or spectral power distribution of the light, and other factors. Segmentation lines 4330 are shown. The phosphor sheet 4328 can be segmented into strips or plates that are disposed in proximity to the top surfaces of the LEE chips. The phosphor sheet 4328 also can include three-dimensional structures (e.g., hemispherical plates) and positioned in proximity to the LEE chips within the optical couplers 4322 to reduce high temperature effects on the phosphor.

The electrodes of bare LEE chips, or the electrodes of submounts on which the bare LEE chips are mounted, are operatively disposed to the PCB pads 4314. Operative disposition may be performed by ultrasonic bonding, gluing, gluing with conductive adhesive, soldering, wire bonding, ball bumping and/or other operative interconnection. The LEEs may be flip chips, vertical chips (using a wire bond for the top LEE electrode), horizontal non-flip with wirebonding to anode and cathode, or other type of chip.

The substrate 4312, optical coupler sheet 4320, and phosphor sheet 4328 can be separated by sawing, routing, perforating, snapping, etching or otherwise, for example. The separation can be facilitated via predetermined breaking lines, also referred to as singulation lines, for example. The resulting strips/plates can be combined with a suitable carrier to form an LEE strip as shown in FIGS. 5B and 5E, for example.

In some embodiments, optical couplers can be manufactured, for example injection molded, in groups of two or more elements and be provided with integral registration elements or receptacles for matingly receiving external registration elements to assure accurate placement of optical couplers relative to suitably disposed LEEs. Registration elements can be configured as indexing pins for insertion into respective holes inside a PCB board or LEE package, for example. Index matching material such as silicone with suitable optical properties can be disposed to provide a predetermined optical coupling between LEEs and the optical couplers. LEE packages can be operatively connected at different stages of the noted process to the optical couplers. Depending on the embodiment, LEE packages can be electrically and/or mechanically disposed on a PCB before or after operative interconnection with the optical couplers.

Optical couplers can be configured to provide one or more receiving apertures, which can be configured to provide tapered inner walls, protrusions, ribs or other elements that provide a predetermined restorative force to the LEEs during the mating procedure so that LEEs and optical couplers can be aligned with predetermined accuracy.

LEEs can be placed within recesses provided by optical couplers by automated equipment and centered by tapered walls or ribs to centered positions with a surrounding layer of gel to index match and optionally be cured to set their positions. An optional processing step can then planarize the assembly and remove excess material in preparation for testing and subsequent electrical and mechanical bonding to a substrate.

In certain embodiments, LEEs can be molded within the optical couplers to form assemblies which then can be optionally tested as a unit and sorted according to certain properties and then can be aligned to a registration point on the substrate prior to electrical and thermal bonding. A tab or pin on the optical coupler body can be employed that is aligned to the substrate matching detail which also aligns the electrical contact points of the LEEs in the x, y and z axes for electrical and thermal bonding. LEEs can be affixed, molded or otherwise operatively coupled with the optical couplers. Furthermore, LEEs can be held in place by mating structures in one or more directions by a registration detail in the input side of the light guide. This can be performed prior to the curing of an optical interface material, which can be used to reduce Fresnel losses at the generated interface. Such steps can help constrain alignment of the electrical contact points at the bottom of the LEE die or packages to align to a substrate for electrical and thermal bonding.

In some embodiments, the LEEs are mounted on a substrate via an adhesive thermal matching gel with a viscous solder paste between their contacts and the substrate such that they can be adjusted minute distances as they are centered within their respective mating recesses within the optical couplers.

Figure 1G:
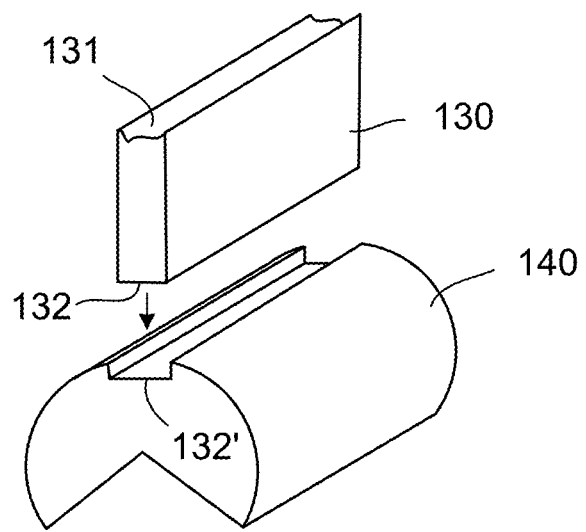
FIG. 1G shows an example of a modular optical extractor and light guide.

Components of luminaires can be made modularly and designed to be assembled in interchangeable ways. For example, FIG. 1G shows how an optical extractor 140 can be modularly configured separately from a light guide 130. The light guide 130 includes an input end 131 (in this example the top edge of the rectangular light guide 130) and an output end 132 (in this example the bottom edge of the rectangular light guide 130). The optical extractor 140 includes an input end 132'. The input end 132' of the optical extractor 140 can be affixed to the output end (bottom edge) 132 of the rectangular light guide 130 employing a suitably optically transparent coupling material having a matched index of refraction such as silicone. The optical extractor 140 can be held in place by the coupling material, mechanical interference, a friction fit or otherwise, for example. This configuration can be employed to permit choosing from a selection of differently configured optical extractors that provide different intensity distributions better suited for a particular lighting application. The optical extractor 140 can also be provided with a variety of distribution optics so that they can be joined to a common light guide 130 in a completely modular fashion to suit the mounting height and lighting requirements of the space.

Figure 1H:
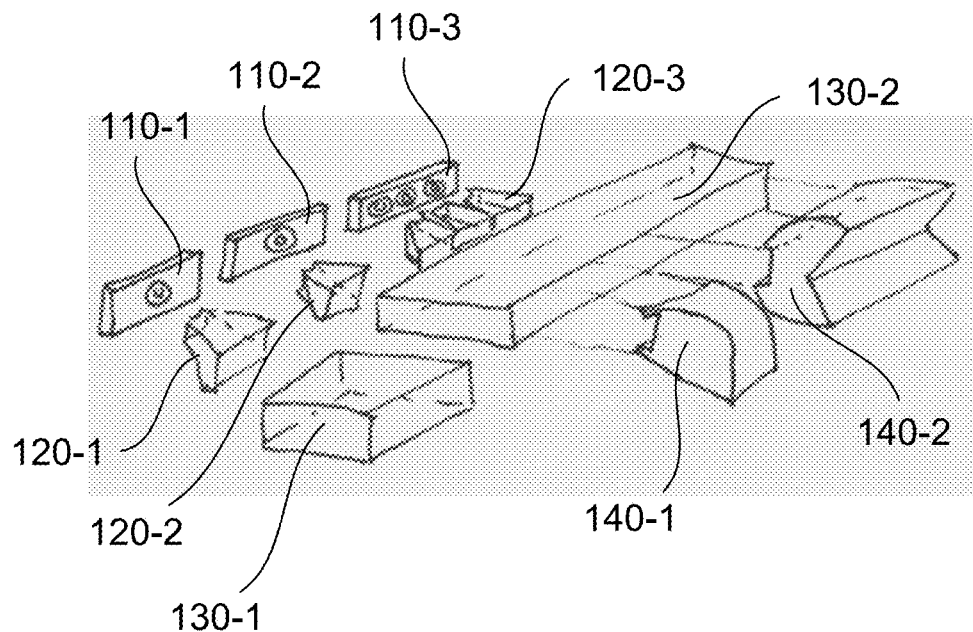
FIG. 1H shows an example of a modular luminaire module.

FIG. 1H shows an example of a modular luminaire module 101. In this example, the luminaire module 101 includes substrates 110-1, 110-2, and 110-3, on which LEEs are disposed, optical couplers 120-1, 120-2, and 120-3, light guides 130-1 and 130-2, and optical extractors 140-1 and 140-2. The optical couplers 120-1, 120-2, and 120-3 can be coupled with the substrates 110-1, 110-2, and 110-3 respectively. The light guides 130-1 and 130-2 can be coupled with the optical couplers. For example, light guide 130-1 can be coupled with optical coupler 120-1 and light guide 130-2 can be coupled with optical couplers 120-2 and 120-3. The optical extractors 140-1 and 140-2 can be coupled with the light guide(s). For example, optical extractors 140-1 and 140-2 can be coupled with the light guide 130-2. The configuration of the modular luminaire module 101 can be modified to provide a desired illumination pattern. For example, different combinations of substrates, optical couplers, light guides, and/or optical extractors can provide different illumination patterns and physical dimensions to adapt the luminaire to specific lighting and space requirements.

Multiple components of a luminaire can be integrally formed. In other words, two or more optical components of a luminaire can be formed from a single piece of optical material. Integrally formed components can limit Fresnel losses that occur at optical interfaces where refractive indices of adjacent optical materials are mismatched. Integral formation can facilitate registration and alignment of respective components of a luminaire.

Figure 1I:
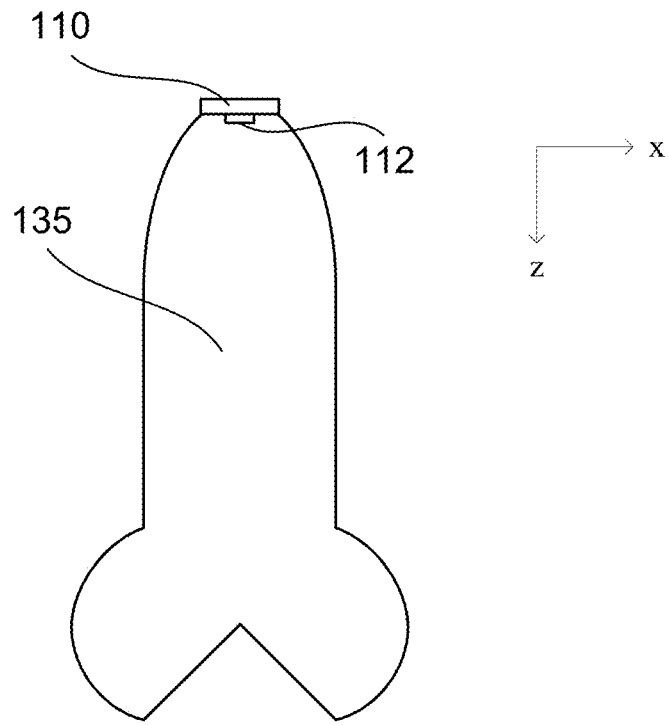
FIG. 1I shows an example of an integrally formed luminaire module.

FIG. 1I shows an example of an integrally formed luminaire module 102. The light guide can be integrally formed with the optical couplers and/or the optical extractor. In this example, the luminaire module 102 includes at least one substrate 110, one or more LEEs 112 disposed on the substrate 110, and an integrally formed portion 135 that includes an optical coupler, a light guide, and an optical extractor. In some implementations, the integrally formed luminaire module 102 is elongated along a longitudinal direction, e.g., along the y-axis. Depending on the complexity of its shape, the integrally formed luminaire module 102 can be manufactured by single or multi-shot molding, extrusion or other process, for example.

(iii) Luminaire Module with LEEs Encased within an Elongated Light Guide

Figure 2:
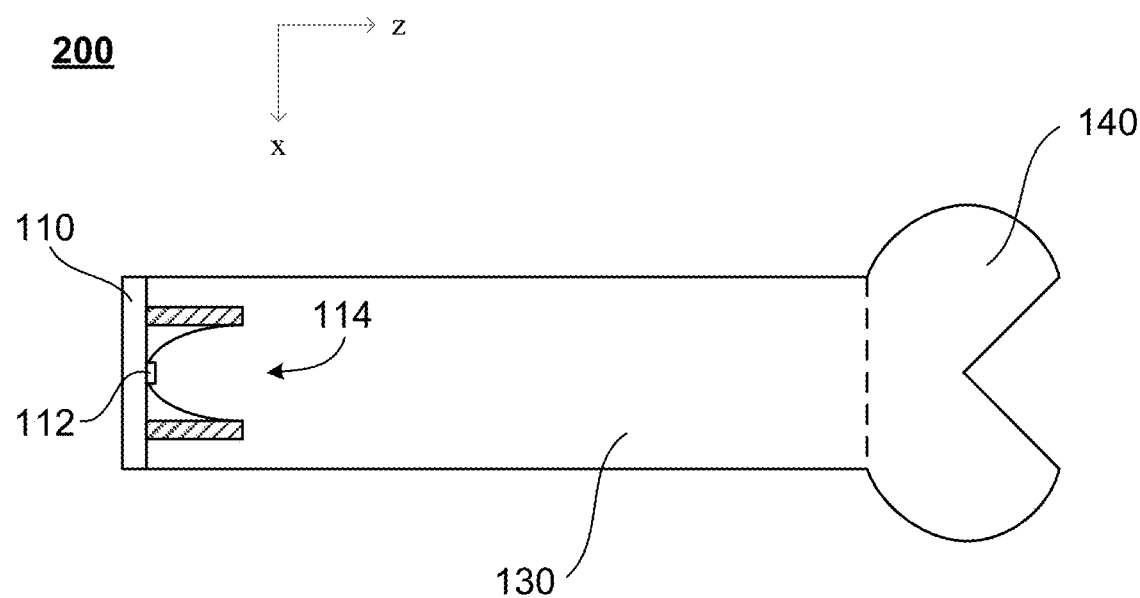
FIG. 2 is an example of a luminaire module with a LEE encased in a light guide.

FIG. 2 is an example of a luminaire module 200 with a light emitting element (LEE) 112 encased within an elongated light guide 130. In some implementations, the integrally formed luminaire module 102 is elongated along a longitudinal direction, e.g., along the y-axis.

The light guide 130 is coupled to an optical extractor 140. In some implementations, the light guide 130 can be a hollow light guide with highly reflective walls that are coupled with the extractor element 140. The LEEs 112 can be contained within an optical structure 114 that provides the coupling function within light guide 130. The LEEs 112 can be a self-contained LED device that can be mounted on a common substrate 110. Any of a wide variety of compact LED packages with or without the optical structure 114 can be used. The optical structure 114 can be provided to couple an angular range of the emitted light into light guide 130. For example, the LEEs can be Luxeon "Z" Light Emitting Diodes or other light-emitting diodes. The light guide 130 can be manufactured on top of the substrate 110 and one or more optical structures 114 by a variety of manufacturing means including injection molding, over molding, casting, thermoforming, UV curing, etc.

Such manufacturing methods can eliminate precision alignment and registration difficulties of optically joining one or more optical structures 114 with an elongated light guide 130. Also, the luminaire module can be built up from the common substrate 110 by molding the optical structure 114, the light guide 130, and optical extractor 140 directly to the common substrate 110 in a single manufacturing step. With such manufacturing methods, the optical coupling efficiency of the optical structure 114 and the light guide 130 can be close to 100% as there is substantially no optical junction between the two components since the light forming and injection into the guide 130 is performed within the light guide 130. If the light guide 130 is hollow, the walls can be manufactured from a highly reflective material and extend to at least the light output aperture of the optical structure 114. The assembly can be combined with other components to provide a complete luminaire.

Figure 3:
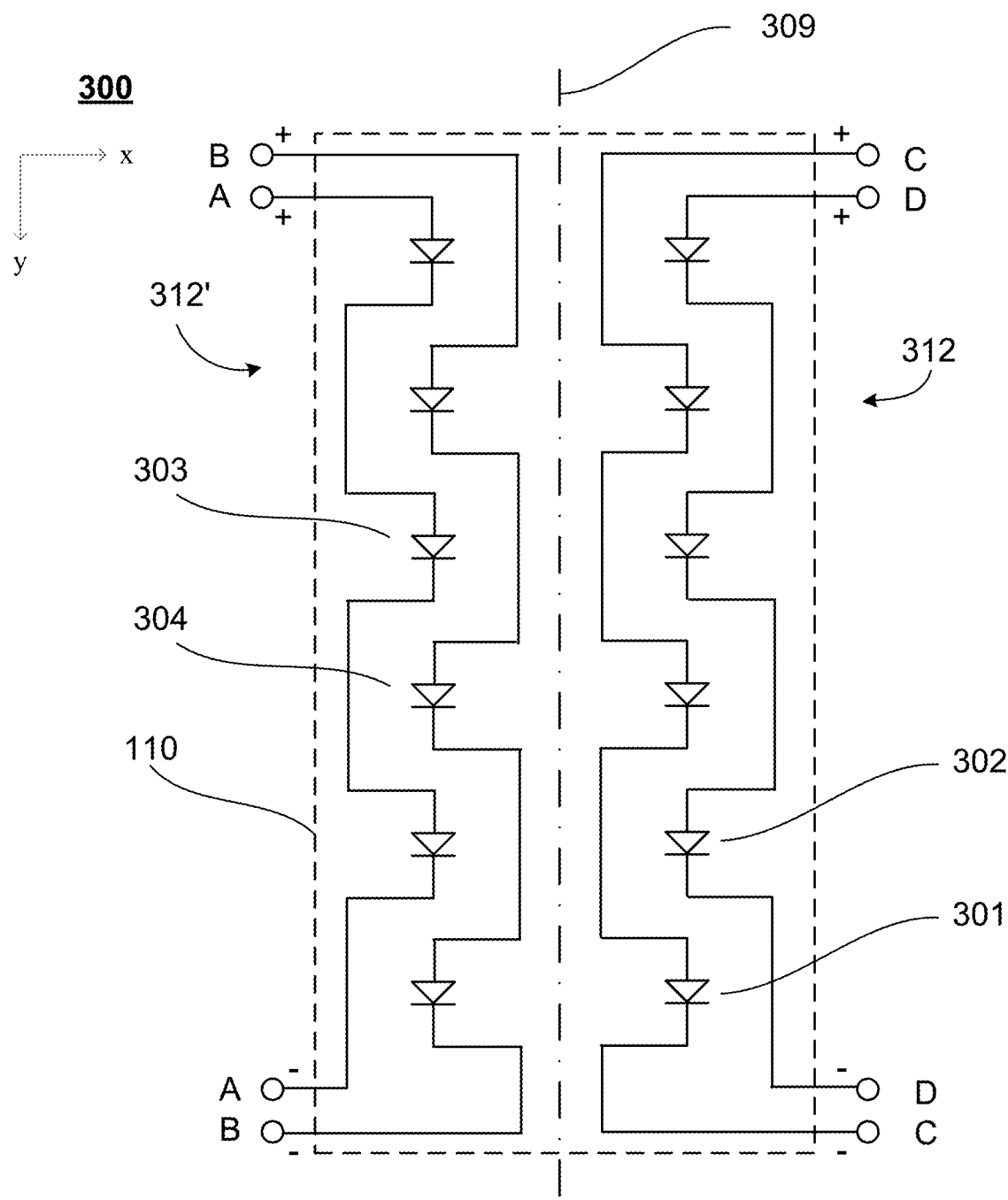
FIG. 3 is an electrical schematic for a luminaire module with multiple sets of LEEs.

(iv) Independent Control of LEEs for a Luminaire Module with Multiple Sets of LEEs In some implementations, different types/sets of LEEs can be used to control chromaticity or color temperature of the light that is output from the luminaire module. For example, each set of LEEs can include two or more LEEs of different correlated color temperatures or chromaticites. FIG. 3 shows an example of an electrical schematic 300 for a luminaire module with two sets of LEEs, LEE set 312 and LEE set 312'. LEE set 312 is disposed on a substrate 110 on one side of a median axis 309 of the substrate. Here, the LEE set 312 includes two subsets of LEEs 301 and 302. For example, the LEEs in the subset 301 can be of a different type relative to the LEEs of the subset 302. Moreover, the LEEs of the subset 301 and the LEEs of the subset 302 are arranged in an interlaced configuration so that the different type LEEs alternate along LEE set 312. Likewise, the LEE set 312' includes two subsets of LEEs 303 and 304. For example, the LEEs in the subset 303 can be of a different type relative to the LEEs of the subset 304. Moreover, the LEEs of the subset 303 and the LEEs of the subset 304 are arranged in an interlaced configuration so that the different type LEEs alternate along LEE set 312'.

In some implementations, the LEEs in the subset 301 are the same type as the LEEs in the subset 304 and LEEs in the subset 302 are the same type as the LEEs in the subset 303. In some implementations, the LEEs in the subset 301 are the same type as the LEEs in the subset 303 and LEEs in the subset 302 are the same type as the LEEs in the subset 304. In some implementations, the LEEs in the subset 301 are of different type from the LEEs in the subsets 303 and 304, and LEEs in the subset 302 are of different type from the LEEs in the subsets 303 and 304.

Note that the LEE set 312' is powered through terminals A(+)A(−) and B(+)B(−) independently from the LEE set 312 which is powered through terminals C(+)C(−) and D(+)D (−). Within the LEE set 312, the LEEs of the subset 301 are powered through terminals C(+)C(−) independently from the LEEs of the subset 301 are powered through terminals D(+)D(−). Further, within the LEE set 312', the LEEs of the subset 303 are powered through terminals A(+)A(−) independently from the LEEs of the subset 304 are powered through terminals B(+)B(−).

(v) Luminaire Modules with and without Color-Over Angle Correction

Figure 4:
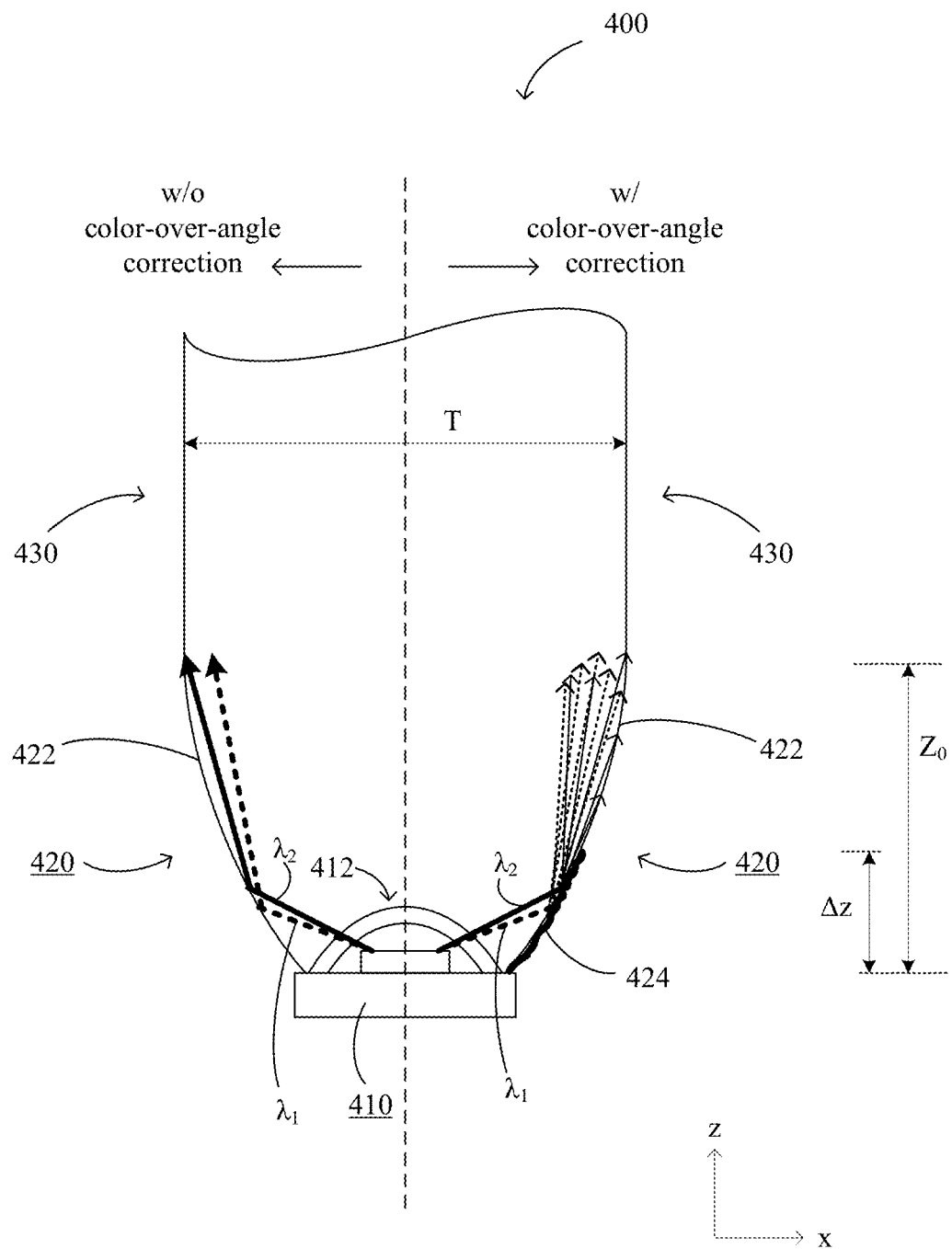
FIG. 4 shows an example of a luminaire module with color-over-angle correction.

FIG. 4 shows an example of a luminaire module 400 with one or more pump LEEs. The luminaire module 400 includes a substrate 410, one or more LEEs 412, one or more optical couplers 420 and a light guide 430. As shown in FIGS. 1A-1E, the substrate 410 and the light guide 430 can be elongated along the y-axis (perpendicular to the page). In such cases, the LEEs 412 are distributed along the y-axis. Each of the LEEs 412 can include a pump LED and a phosphor layer encompassing the pump LED. In this manner, each of the LEEs 412 emits light having a broad spectrum through, for example, a dome-shaped output surface. The broad spectrum of the emitted light includes shorter wavelengths $\lambda_1$ associated with the pump LED and longer wavelengths $\lambda_2$ associated with the phosphor layer. In some implementations, emitted light with shorter wavelengths $\lambda_1$ has a first emitted angular range and the emitted light with the longer wavelengths $\lambda_2$ has a second emitted angular range, where a divergence of the first emitted angular range is larger than a divergence of the second emitted angular range. The first and second emitted angular ranges can be different from each other by 1, 2, 5 or 10°, for example. Such chromatic variations can arise from the light conversion provided by the phosphor. Additional chromatic variations may arise when the emitted light is reflected at surfaces of the coupler 420 and the light guide 430 or even during propagation of light within the optical coupler 420 and the light guide 430.

Each of the optical couplers 420 is arranged to receive the light emitted by corresponding LEEs 412 and shaped to redirect the light received from the LEEs 412, such that a divergence of the redirected light is smaller than a divergence of the light received from the LEEs 412 at least within the x-z plane. Depending on the implementation, an optical coupler without color-over-angle correction, having a curved but otherwise smooth surface 422 as illustrated on the left of FIG. 4, may preserve the noted chromatic variations. An optical coupler with color-over-angle correction, on the other hand, includes a curved surface 422 as illustrated on the right side of FIG. 4 with a suitably configured additional surface structure. The additional surface structure, when properly configured, can be used to control the noted chromatic effects and as such aid to mitigate color anisotropies in the light output by the luminaire module 400. Depending on the implementation, the additional surface structure can include mesoscopic or microscopic surface structures, which can be configured to provide a certain degree of diffusion to the reflected light as described further below.

A length of the optical coupler(s) 420 along the z-axis is $Z_0$. Depending on the implementation, the couplers 420 can include a specularly reflective surface 422. Note that the optical coupler(s) 420 configured without color-over-angle correction (as shown on the left side of the dashed-axis) provide redirected light with shorter wavelengths $\lambda_1$ in a first redirected angular range and redirected light with longer wavelengths $\lambda_2$ in a second redirected angular range, where a divergence of the first redirected angular range is larger than a divergence of the second redirected angular range.

The light guide 430 receives, at its input end, the redirected light from the optical coupler(s) 420 configured without color-over-angle correction and guides it along the z axis to an output end of the light guide (not shown in FIG. 4.) The light guide 430 has a thickness T (along the x-axis) and a length D>>T (along the z-axis). The light guide 430 can be elongated along the y-axis with a width L>T. The light guided to the output end is extracted by an optical extractor (not shown in FIG. 4) and output into the ambient to illuminate a target surface. Typically, the light guide 430 does not alter the difference between the divergence of the first redirected angular range of the redirected light with shorter wavelengths $\lambda_1$ and the divergence of the second redirected angular range of the redirected light with longer wavelengths $\lambda_2$. As such, the light output by the luminaire module 400 configured without color-over-angle correction (as shown on the left side of the dashed-axis) may show color separation at edges of the illuminated target surface placed in a far-field.

To reduce or eliminate the above-noted color separation at the edges of the illuminated target surface in the far-field, the optical coupler(s) 420 are configured with color-over-angle correction (as shown on the right side of the dashed-axis) in the following manner. The optical coupler(s) 420 have, in addition to the specularly reflective surface 422, a diffusive reflective surface 424 disposed, along the y-axis, adjacent to the LEEs 412. Along the z-axis, the diffuse reflective surface 424 covers a length Δz that is a fraction 0.1, 0.2, 0.5 or 1 of the length ($Z_0$-Δz) of the specularly reflective surface 422. In some implementations, the diffuse reflective surface 424 covers, along the y-axis, contiguous or discontinuous portions of the width L. In other implementations, the diffuse reflective surface 424 covers, along the y-axis, the entire width L.

Light emitted by the LEEs 412 with shorter wavelength $\lambda_1$ in the first emitted angular range diffusely reflects off the diffuse reflective surface 424 and light emitted by the LEEs 412 with longer wavelength $\lambda_2$ in the second emitted angular range also diffusely reflects off the diffuse reflective surface 424, such that the diffusely reflected light with shorter wavelength $\lambda_1$ mixes with the diffusely reflected light with longer wavelength $\lambda_2$. In this manner, the optical coupler(s) 420 configured with color-over-angle correction (as shown on the right side of the dashed-axis) provide redirected light with both shorter wavelengths $\lambda_1$ and longer wavelengths $\lambda_2$ in a single redirected angular range.

As such, the light guide 430 receives, at its input end, the redirected light with both shorter wavelengths $\lambda_1$ and longer wavelengths $\lambda_2$ from the optical coupler(s) 420 configured with color-over-angle correction (as shown on the right side of the dashed-axis) in a single redirected angular range and guides such redirected light along the z axis to an output end of the light guide (not shown in FIG. 4.) In this manner, the light output by the luminaire module 400 with color-over-angle correction (as shown on the right side of the dashed-axis) shows no color separation at the edges of the illuminated target surface placed in the far-field.

(vi) Configuration and Assembly of Modular Luminaire Modules

Figure 5A:
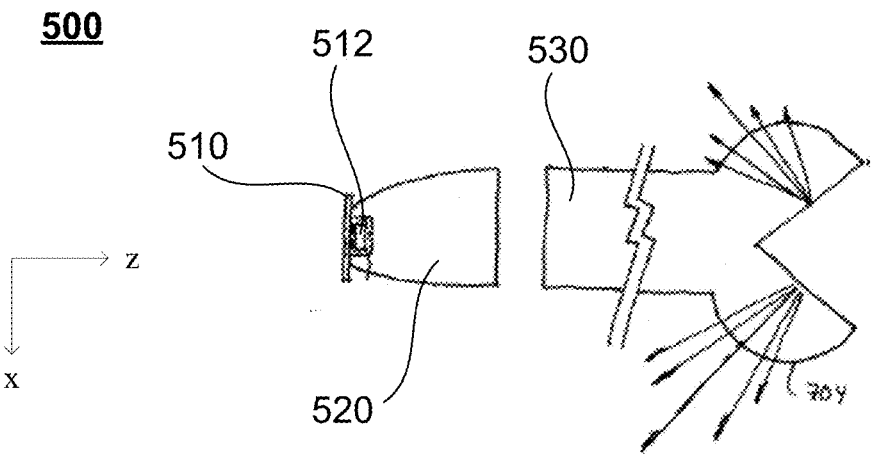
FIG. 5A shows another example of a modular luminaire module.
Figure 5B:
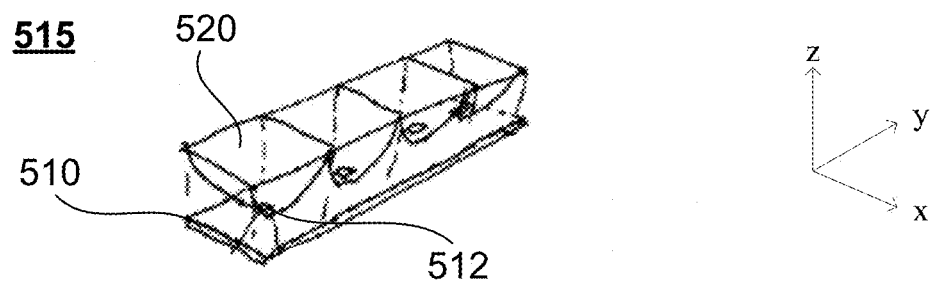
FIG. 5B shows an example of multiple optical couplers assembled to a substrate.

FIG. 5A shows an example of a modular luminaire module 500. In some implementations, the modular luminaire module 500 is elongated along a longitudinal direction, e.g., along the y-axis. The components of the luminaire module 500 can be configured such that challenges related to high precision alignment during manufacturing can be reduced. The modular luminaire module 500 includes LEEs 512 that are mounted to a substrate 510 (e.g., a carrier strip or circuit board,) and corresponding optical coupler(s) 520 can be provided in one of many backend packaging steps that can include:

Silicone overmolding with index matched silicone. The substrate 510 is held with the LEEs 512 in alignment with a molding cavity that seals around the LEEs 512. Vent holes are provided in either the cavity or the substrate to permit liquid silicone or other material to be injected into the cavity such that air bubbles will not form around the LEEs 512. A catalyst is provided that will cause the silicone to take a permanent form.

Two part injection molding with transparent plastic and elastomeric interface to LEEs 512.

Injection molded transparent plastic component with encapsulation and bonding step. A pre-molded plastic strip of optical couplers 520 is provided with registration features that align to the substrate 510 and locations of the LEEs 512. During assembly, an elastomeric or gel like compound is provided around the LEEs 512 as an index matching encapsulation that will optically couple the LEEs to the strip of optical couplers 520. As the strip of optical couplers 520 is drawn to the substrate, locking features such as heat stakes or snaps are engaged between the strip of optical couplers 520 and the substrate 510 to lock the assembly to the substrate 510 and LEEs 512.

The above methods can be used to ensure that the LEEs 512, substrate 510 and optical couplers 520 are mechanically and optically engaged into a sub-assembly 515 as shown in FIG. 5B.

Figure 5C:
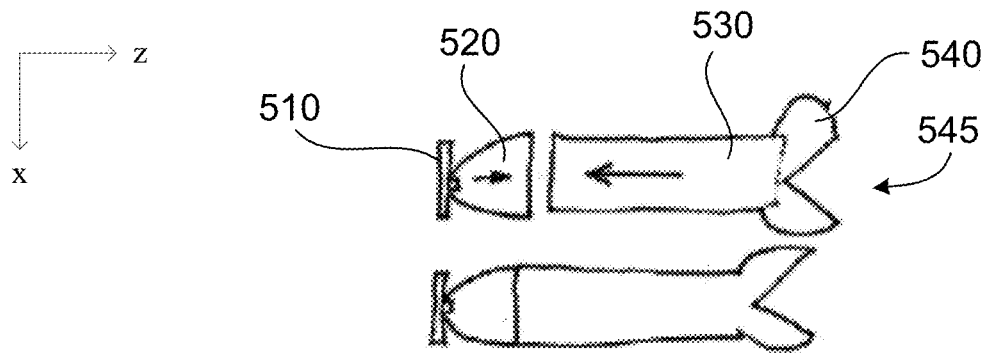
FIG. 5C shows an example of coupling optical couplers with a light guide.

FIG. 5C shows and example of how the optical couplers 520 and light guide 530 can be coupled together in a manufacturing step. The sub-assembly 515 can be mounted within the luminaire body extending thermal and electrical interfaces to the outside. Note that in some implementations, the luminaire body is elongated along a longitudinal direction, e.g., along the y-axis. This assembly could also be molded right into a thermally dissipating plastic housing so that the thermal interface from the lower side of the substrate 510 is molded directly into the luminaire module housing thereby decreasing the thermal resistance of that part to the luminaire module. The light guide 530 and optical extractor 540 sub-assembly 545 is then brought together and joined, for example, by a mechanical force or by an adhesive with index matching properties that will reduce optical losses at the interface between optical coupler 520 and light guide 530.

This division line between components enhances the modular nature of the optical coupler 520 that can be standardized for many different types of luminaire module designs and extraction patterns of light. If the luminaire module is built up from the optical coupler 520, it may be simpler to specify a custom light guide 530 with a custom optical extractor 540 and possibly further optical structures, such as tertiary reflectors, diffusers etc. to create various different luminaire module designs from one standardized core component that is readily adapted for mass manufacturing. In some implementations, the downstream use of custom interchangeable light guides 530 and optical extractors 540 with asymmetrical (e.g., single-sided extractors not shown in FIG. 5) or symmetrical (e.g., double-sided extractors 540) properties that could be available to the installer, or end user, to change the overall photometric profile and characteristics of the luminaire module.

Figure 5D:
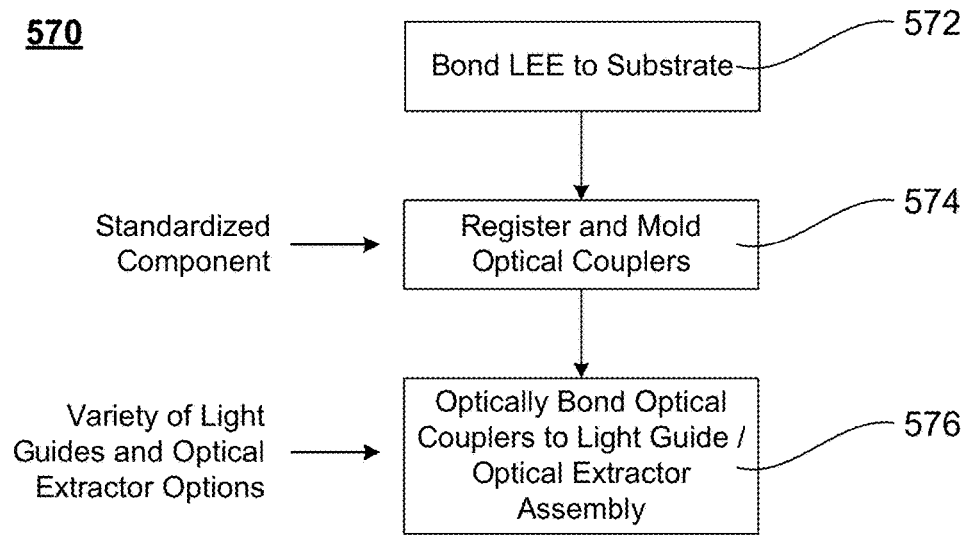
FIG. 5D is a flow chart describing an assembly process of a luminaire module.
Figure 5E:
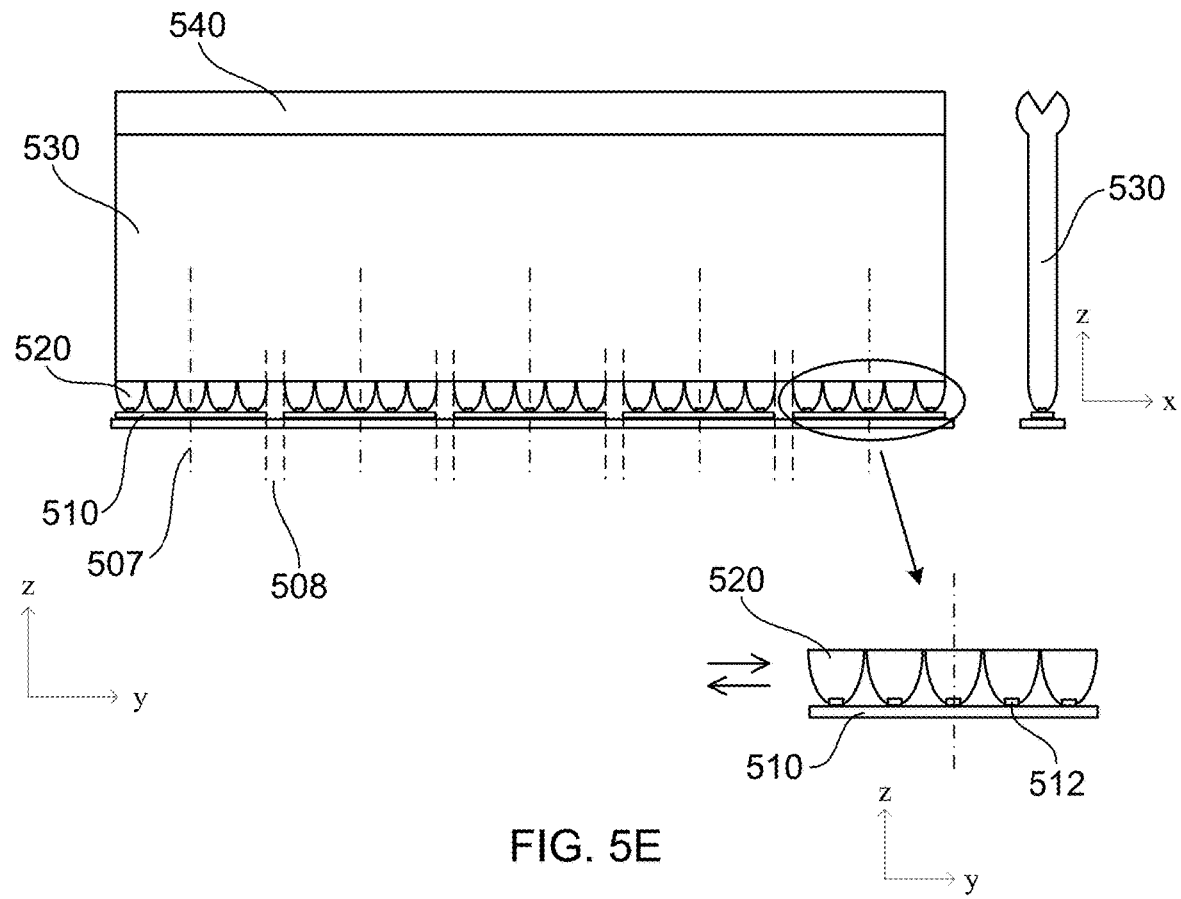
FIG. 5E shows an example of a luminaire configured to compensate for thermal expansion and contraction of components of a luminaire module.

FIG. 5D is a flow chart that describes an assembly process 570 of a luminaire module, such as the luminaire module 500 described in connection with FIG. 5A. In step 572, LEEs are bonded to a substrate. In step 574, an optical coupler is registered and molded to the substrate with the LEEs. The optical coupler can be a standardized component used to fabricate multiple kinds of luminaire module. At step 576, the optical couplers are optically bonded to a light guide/optical extractor assembly. The light guide and optical extractor can be optically coupled by the methods described herein (e.g., mechanical force, mechanical interference, a friction fit, adhesive, etc.) The light guide and/or optical extractor can be customized for various lighting applications.

FIG. 5E shows an example of a luminaire module 580 that is configured to compensate for thermal expansion and contraction of components of the luminaire module 580. The various materials used in luminaire modules may have different thermal characteristics. Variations in coefficients of thermal expansion between disparate materials can be addressed with the technologies described herein. Generally, the differential expansion between materials is additive and therefore, the longer the luminaire module, the higher is the additive differential value, which may cause misalignment issues. By decoupling the expansion at the parting line between the optical coupler 520 and the light guide 530, for example, it is generally possible to specify an elongated light guide 530 (e.g., along the y-axis), which can be coupled to one or more substrates 510 and optical couplers 520.

The maximum length of the optical couplers 520 is generally defined by the maximum allowable thermal deviation of the input aperture of the optical couplers relative to the LEEs. For example, if the optical coupler 520 has a differential expansion of 0.01 mm over a temperature and humidity range in the elongated dimension (e.g., along the y-axis), a tolerance at the input of 0.10 mm would allow for up to 10 couplers assembled in a row (if a reference datum is at one side of the luminaire module.) However, it is noted that manufacturing processes likely require safety margins that are employed with tolerance stack and possible manufacturing placement misalignments, reducing the acceptable number of optical couplers 520 in the above example to less than 10 units per row. Decoupling the various components of the luminaire module 580 within the edge coupled assembly process to account for variations in mechanical placement, expansion and manufacturing errors can provide significant value. Such configuration can reduce the possibility of damaging the LEEs during the manufacturing process and limit possible optical inefficiencies and variations introduced by misalignment of the LEEs with respect to the corresponding optical coupler(s) 520.

In the example illustrated in FIG. 5E, a datum point 507 can be designed to pass through the center of the substrate 510, the LEEs 512, and the optical couplers 520. The optical couplers 520 can have a length that is a fraction of the overall length of the light guide 530 (along the y-axis) and arranged such that the optical couplers 520 inject light into the light guide 530 along the overall length of the light guide 530. Therefore, the mechanical assembly of the luminaire module 580 can involve staking central datum points on the elongated substrate 510 (which may be created in sections with expansion capability) along the input edge of a much longer light guide/optical extractor assembly. The space 508 between groups of optical couplers 520 may prevent one group of optical couplers from interfering with an adjacent group of optical couplers and provide the necessary tolerance to compensate for misalignment of optical couplers and LEEs. In some implementations, the allowable expansion between groups of optical couplers and/or light guide and optical extractor falls within the strain allowance of the optical bonding materials there between so that low injection losses can be maintained.

(vii) Luminaire Module with a Light Guide at Least Partially Covered with a Protective Material While the light guide of the luminaire module can be exposed to the environment, the light guide can also be covered with a protective material.

Figure 6:
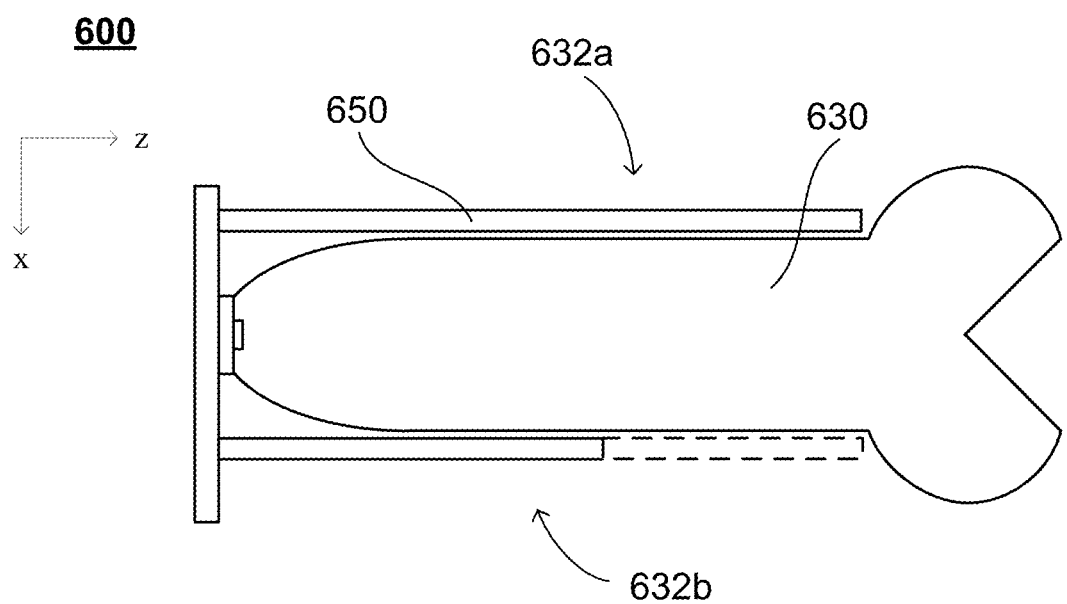
FIG. 6 shows an example of a luminaire module including a light guide that is at least partially covered.

FIG. 6 shows a luminaire module 600 with a light guide 630 that is at least partially covered with a protective material 650 (e.g., a shroud.) In some implementations, the luminaire module 600 is elongated along a longitudinal direction, e.g., along the y-axis. For example, the luminaire module 100, 100', 100" or 100''' can be modified as described below to obtain the luminaire module 600.

The protective material 650 can be placed on at least a portion of one, or both sides 632a, 632b of the light guide 630. Since a solid light guide 630 is configured to provide total internal reflection, the protective material 650 placed in proximity of the light guide 630 without surface contact to the light guide 630 generally has no impact on the transmission of light within the light guide 630.

The protective material 650 can provide, for example, protection of the light guide (e.g., from finger prints and scratches) and aesthetic features for luminaire modules.

In some implementations, the protective material 650 can include decorative and functional cut-outs or areas of translucency, or other such aesthetic and functional treatments in the protective material that can be optionally arranged in any pattern, length or width on one, or both sides 632a, 632b of the light guide 630.

(viii) Luminaire Modules with Diffusive Light Output Surfaces

In general, luminaire modules 100, 100', 100" or 100''' (described herein in connection with FIGS. 1A-1E) can include several features useful for tailoring the light intensity profile. For example, in some implementations, luminaire modules can include an optically diffusive material that can scatter light to help homogenize the luminaire's intensity profile. In some implementations, surfaces 142 and 144 as described with respect to FIG. 1A can be at least partially roughened or coated with a diffusely reflecting material, rather than covered with a specular reflective material. Accordingly, the optical interfaces at surfaces 142 and 144 can diffusely reflect and/or transmit light, and therefore scatter light into broader lobes than would be output by similar structures utilizing specular reflection at these interfaces.

In some implementations, the surfaces 142, 144 can include optical structures that facilitate light distribution. For example, surfaces 142 and 144 can each have multiple planar facets at differing orientations. Generally, each facet reflects and/or transmits light in different directions. In some implementations, surfaces 142 and 144 can include structural features that scatter or diffract light, for example. Examples of diffusive components and manufacturing methods and/or processes are described herein.

In some implementations, a light scattering material can be disposed on light output surfaces of an optical extractor, such as light output surfaces 146 and 148 of optical extractor 140 described with respect to FIG. 1A. In some implementations, surfaces 146 and 148 can have shapes other than a constant radius of curvature. For example, surfaces 146 and 148 can include portions having differing curvature and/or include structures disposed on the surfaces (e.g., structural features that scatter or diffract light).

Example 1: Optical Extractor with Diffusive Light Output Surfaces

In some implementations, a luminaire module may require some level of diffusion to blur variations of light along an elongated dimension of the luminaire module, e.g., along the y-axis that can arise from employing discrete LEEs as a light source for the optical system. In some implementations, some level of diffusion can be desirable within the x-z plane (the plane perpendicular to the y-axis.) To achieve such diffusion, linear (one dimensional) diffusive, two dimensional diffusive, or other diffusive properties can be incorporated into a luminaire module.

Figure 7A:
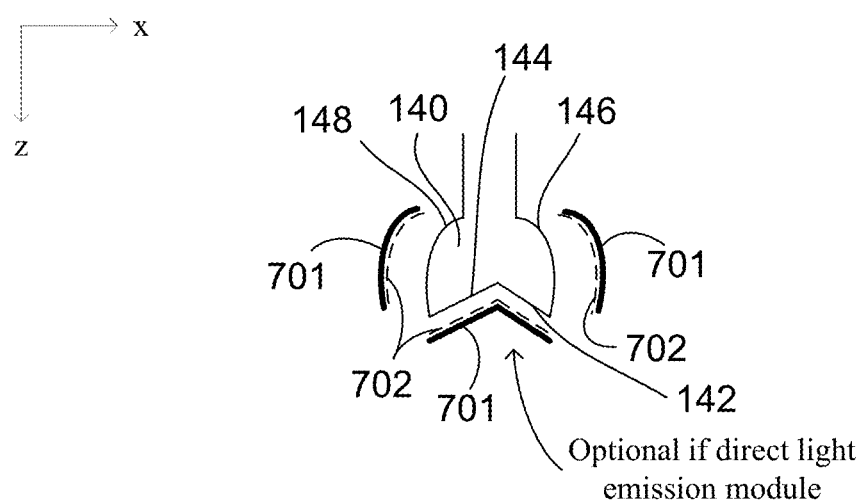
FIGS. 7A-7B show an example of how diffuse reflective and/or transmissive films can be applied to surfaces of an optical extractor.
Figure 7B:
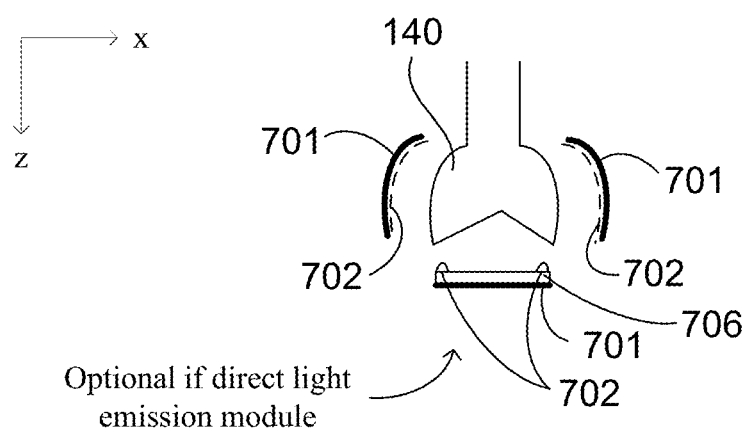

In some implementations, diffuse reflective and/or transmissive films can be applied to surfaces of a luminaire module. FIGS. 7A and 7B show how diffuse reflective and/or transmissive films 701 can be applied to surfaces 142, 144, 146 and/or 148 of an optical extractor 140. The diffuse reflective and/or transmissive films 701 can have adhesive properties or include an adhesive layer 702. In some implementations, a diffuse reflective and/or transmissive film 701 can be shaped to conform to the shape of the respective surface to which it is applied.

The diffuse reflective and/or transmissive films 701 can be configured to provide one dimensional, two dimensional, or other diffusive characteristics. In some implementations, the diffuse reflective and/or transmissive films 701 can have different diffusive or other optical properties for different surfaces. In some implementations, the diffuse reflective and/or transmissive films 701 can be applied to external structures, such as a cap 706, that can be coupled with the luminaire module. The external structures can be permanently affixed to the luminaire module or removable/replaceable components.

In some implementations, the adhesive layer 702 can be cured with ultraviolet light, heat or other agents, or be self-curing over time, for example. In some implementations, the adhesive layer 702 can include silicone, epoxy and other substances that do not require UV or thermal curing.

Figure 8:
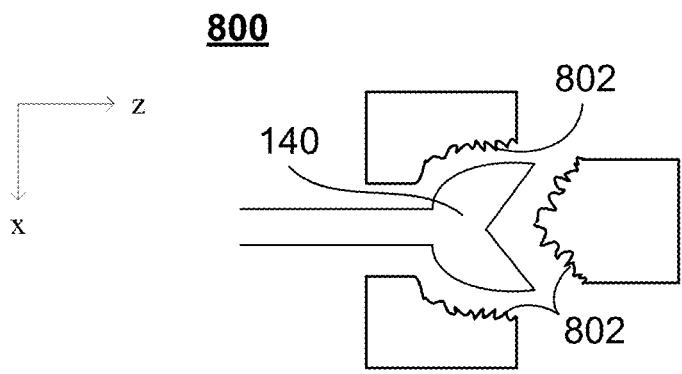
FIG. 8 shows an example of a molding tool for forming an optical extractor with diffusive surfaces.

In some implementations, diffusive characteristics of a luminaire module can be implemented during the manufacturing process of the extractor or other component of the luminaire module. For example, diffusive surfaces can be formed using a molding process. FIG. 8 shows a tool 800 that can be used to form an optical extractor 140 with diffusive surfaces. For example, diffusive surfaces of an optical extractor 140 can be fabricated using a structure 802. The structure 802 can be a surface of the tool or a diffusive film that can be affixed to the respective surface of the optical extractor or a surface of the tool and inlayed during the molding process of the optical extractor 140.

In some implementations, diffusive properties can be thermally formed after molding of the respective component of the luminaire module. For example, the optical extractor can be molded with generally smooth surfaces and in a following manufacturing step, one or more surfaces can be imprinted with a texture or other structure to generate a diffusive surface.

Figure 9A:
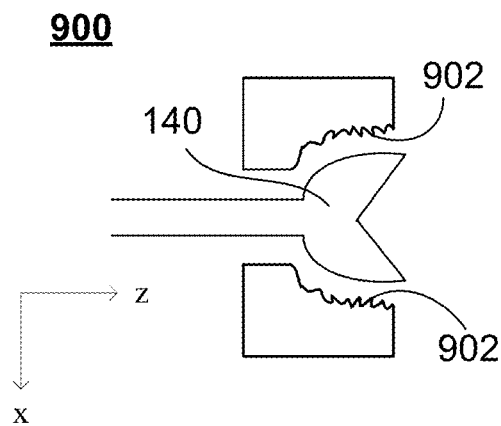
FIGS. 9A-9C show examples of tools that can be used to incorporate diffusive light output surfaces into an optical extractor.

In some implementations, diffusive characteristics of a luminaire module can be incorporated by using a heated tool to reform one or more surfaces of the luminaire module. FIG. 9A shows an example of a tool 900 that can be used to reform an optical extractor 140 of a luminaire module. In this example, the optical extractor 140 is fabricated, at least in part, from a material that allows for thermal imprint molding.

Figure 9B:
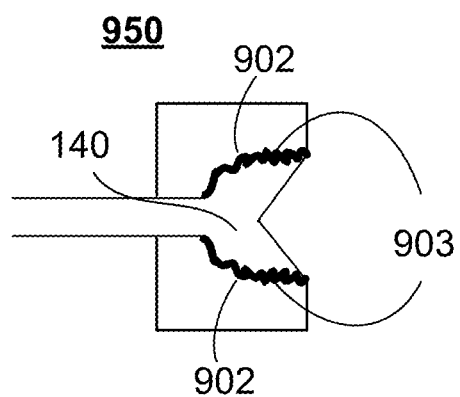

Diffusive properties can be added to the optical extractor 140 during a molding step by imprinting a structure 902 of the heated tool 900 into one or more surfaces of the optical extractor 140. In some implementations, diffusive properties can be incorporated into the optical extractor 140 by disposing a layer of material 903 over the optical extractor 140 and molding the layer of material 903 to the optical extractor 140 via tool 950 to the optical extractor as shown in FIG. 9B. The tool 950 includes a structure 902 that forms the diffusive surface(s) of the optical extractor 140 during the molding process.

Figure 9C:
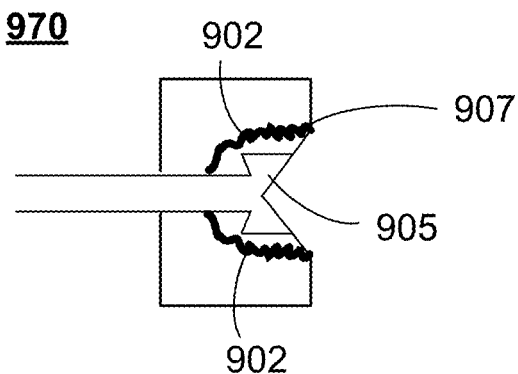

In some implementations, an optical extractor 140 with diffusive light output surfaces can be molded using an anchor structure 905 as shown in FIG. 9C.

Molding material can be injected into a molding tool 970 to form the macroscopic shape of the optical extractor (e.g., shapes of surfaces 142, 144, 146, 148 as shown in FIG. 1A.) The tool 970 can include structures 902 that form the microscopic structure of the diffusive light output surface(s).

Generally, the molding material can have a low viscosity such that the structure 902 of the molding tools can be replicated. The molding material can be thermally, UV or otherwise curable.

In some implementations, diffusive properties can be added to components of the luminaire module by mechanical, chemical or other processes such as sanding, sandblasting, etching or other process. Generally, diffusive surface structures may have various shapes and sizes (e.g., micrometer or other sizes.) For example, holographic diffusers can have surface structures including sizes of a few micrometers, a few ten to several ten micrometers or even larger sized structures.

Figure 10A:
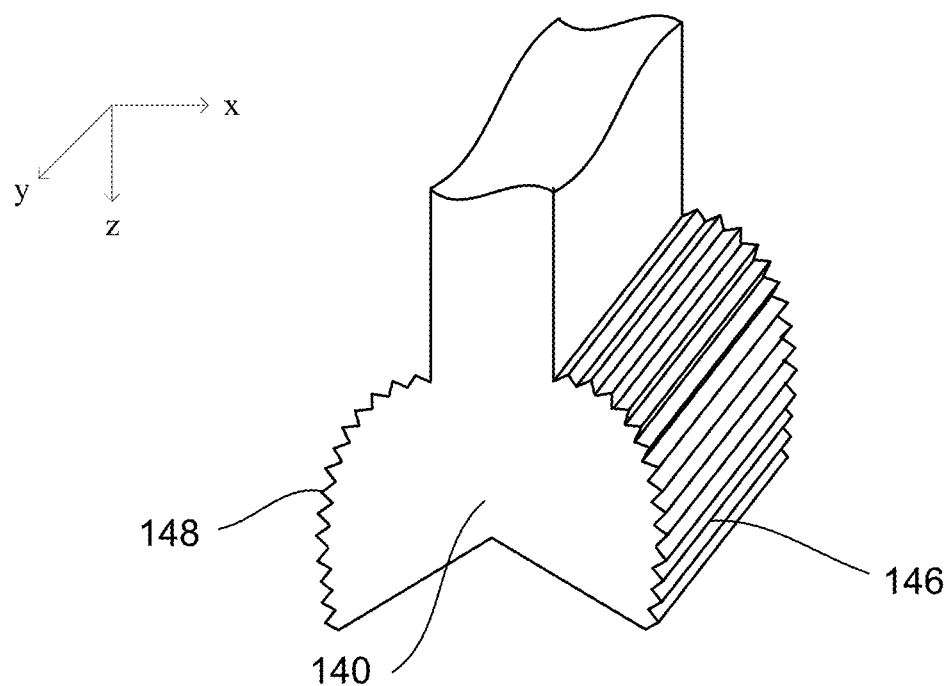
FIG. 10A shows an example of an optical extractor including light output surfaces with 1-dimensional diffusive structures.

FIG. 10A shows an example of an optical extractor 140 with diffusive light output surfaces 146 and 148. In some implementations, one-dimensional structures (e.g., facets, v-grooves, indentations, etc.) with translational symmetry along the y-axis are incorporated into the output surfaces 146, 148 of the optical extractor 140 to generate a desirable level of diffusion within the x-z plane (perpendicular to the y-axis.) In some implementations, diffusive properties can be provided by one dimensional undulating surface structures. In some cases, any of the foregoing diffusive structures can also include microlenses.

Figure 10B:
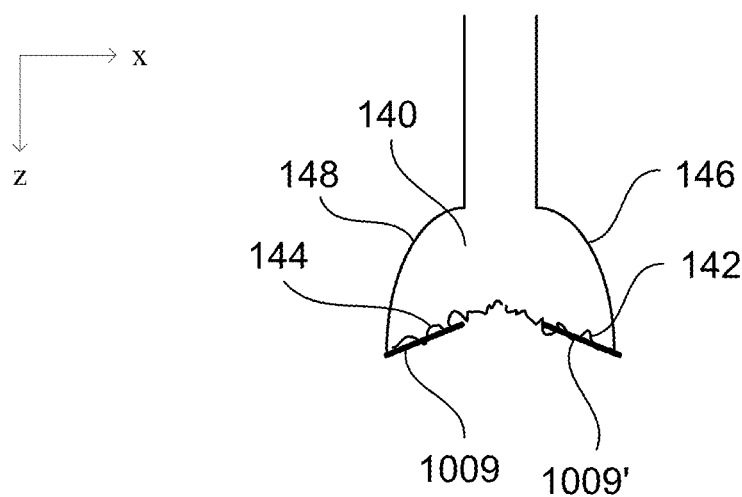
FIG. 10B shows an example of an optical extractor with diffusive redirecting surfaces and reflectors.

FIG. 10B shows an example of an optical extractor 140 with diffusive surfaces 142, 144 and reflectors (e.g., mirrors) 1009, 1009'. The diffusive surfaces 142 and 144, at least partially, transmit light and some of the transmitted light is reflected via reflectors 1009 and 1009' towards light output surfaces 146 and 148. Diffusive surfaces and/or reflectors can be incorporated with any surface of an optical extractor to provide a desired illumination pattern.

In some implementations, diffusive properties of light output surfaces of a luminaire module can be provided by incorporating diffusive properties below the light output surface. For example, the mold material can include diffusive properties. An optical extractor can be formed from a composite material that includes multiple diffusive centers embedded in an otherwise clear host substance, for example. The diffusive properties of such a composite material can depend on the size and density of the diffusive centers, the refractive indices of the diffusive centers, the host material and other aspects. The composition of the composite material generally defines the diffusive characteristics of the optical component.

Example 2: Optical Extractor Coupled with an Optical Insert Including a Diffusive Light Output Surface While diffusive properties can be incorporated in surfaces of a luminaire module, the incorporation of optical inserts with diffusive characteristics is also possible. In some implementations, a luminaire with an optical extractor that provides forward light extraction can be configured to diffuse forward extracted light through an optical insert that is optically coupled to the optical extractor.

FIGS. 11A-11C show an example of a luminaire module 1100 with an optical extractor 140 and an optical insert 1105 that is coupled with surfaces 142 and 144 of the optical extractor 140. In some implementations, the luminaire module 1100 is elongated along a longitudinal direction, e.g., along the y-axis. The optical insert 1105 receives light from surfaces 142 and 144 of the optical extractor 140 and outputs the received light through a diffusive surface 1107 (e.g. a diffusive coating.) In some implementations, materials used for the optical extractor 140 and optical insert 1105 can have a similar refractive index. The optical insert 1105 can be an insert or a plug. In some implementations, the surfaces 142 and 144 of the optical extractor are uncoated.

In some implementations, the optical insert 1105 can be wedge shaped to conform to the shape of surfaces 142 and 144 of the optical extractor 140. The optical insert 1105 can include reflectors 1109 and 1109' that are configured to at least partially reflect some of the light that is output through surfaces 142 and 144 towards surfaces 146 and 148 of the optical extractor 140. When coupling the optical insert 1105 to the optical extractor 140, the reflectors 1109 and 1109' can create the connection between the optical extractor 140 and the optical insert 1105, and a cavity 1111 (e.g., an air gap) can be formed where no reflector is disposed on light input surfaces of the optical insert 1105.

The optical insert 1105 can form an apex that is complementary to an apex of the optical extractor 140.

Figure 12A:
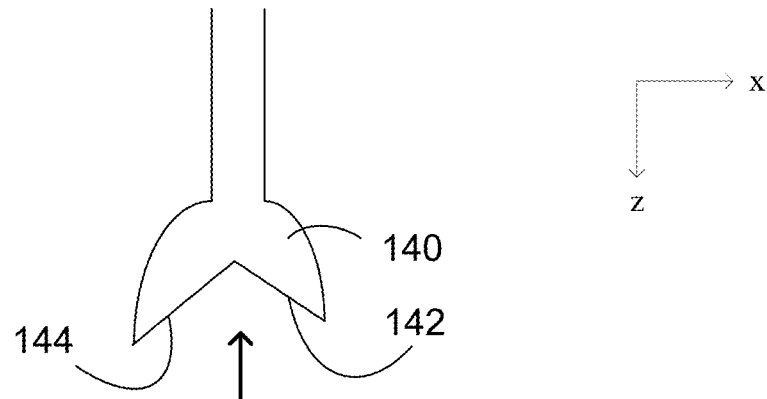
Figure 12B:
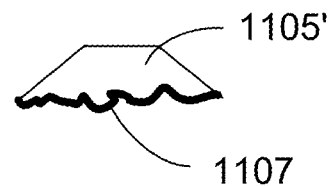
Figure 12C:
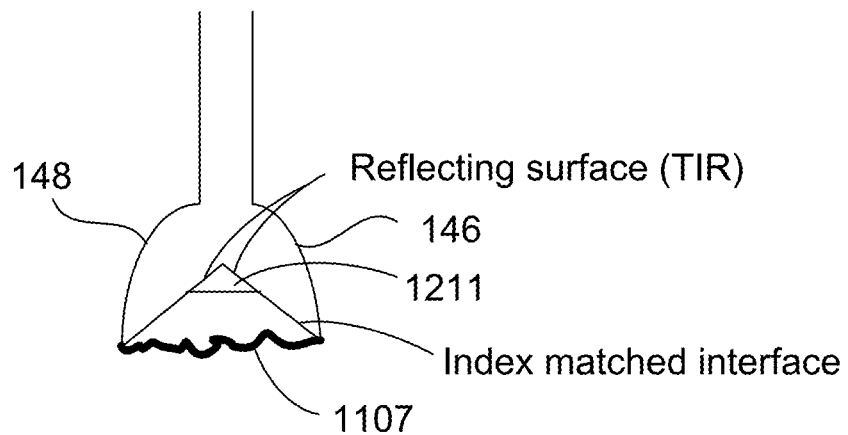

In some implementations, another optical insert 1105' can have a truncated wedge shape. The optical insert 1105' can be used in conjunction with the luminaire module 1100 as shown in FIGS. 12A-12C. The optical insert 1105' can have a diffusive light output surface 1107 (e.g., a diffusive coating) while the other surfaces of the optical insert 1105' can be uncoated. During the assembly process, the optical insert 1105' is coupled with surfaces 142 and 144 of the optical extractor 140, forming a cavity 1211 between the optical insert 1105' and the optical extractor 140.

In some implementations, materials used for the optical extractor 140 and optical insert 1105' can have a similar refractive index and a medium (e.g., gas, air, a liquid, or solid material) in the cavity 1211 has a refractive index that is smaller than the refractive index of the optical extractor 140 and/or the optical insert 1105'. In such configurations, the light that impinges on the surfaces 142 and 144 in areas adjacent to the cavity 1211 can be reflected via total internal reflection (TIR) towards surface 146 and 148 of the optical extractor 140. In some implementations, the refractive index of the medium in the cavity 1211 can be matched with the refractive indices of the optical extractor and/or the optical insert.

Generally, reflectors, such as reflectors 1109, 1109' described above, can be specular or otherwise reflective. The reflectors, the optical extractor and/or the optical insert can have adhesive surfaces or include an adhesive layer (not illustrated) on surfaces thereof so the components can be affixed to each other.

Figure 13A:
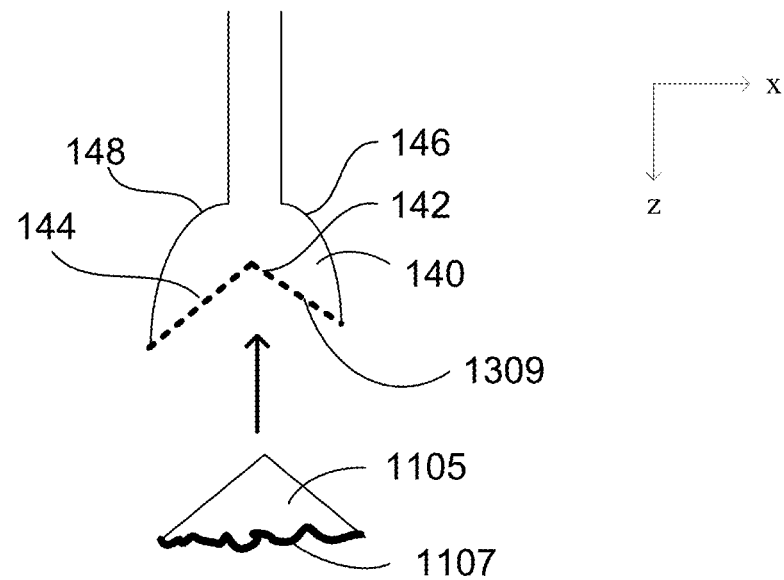
Figure 13B:
Figure 13C:
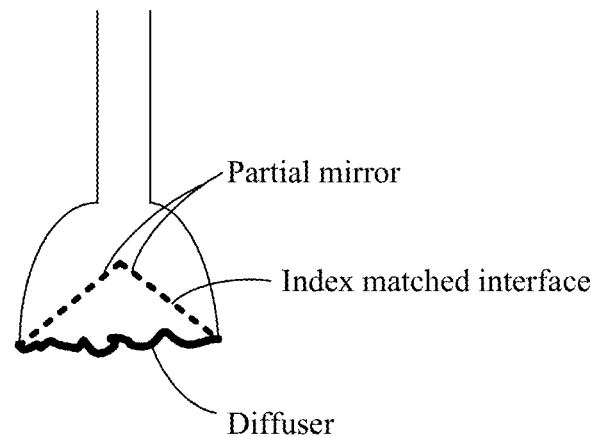

In some implementations, the surfaces 142 and 144 of the optical extractor (or portions thereof) of the luminaire module 1100 can be coated with a reflector 1309 (e.g., with a perforated mirror or a partially reflective coating) as shown in FIGS. 13A-13C. Here, an optical interface between the optical insert 1105 and the optical extractor 140 is formed by the reflector 1309. Light that impinges on the surfaces 142 and 144 of the optical extractor is partially reflected towards light output surfaces 146 and 148 of the optical extractor 140 and partially transmitted through the reflector 1309 towards a diffusive light output surface 1107 of the optical insert 1105.

The light input surfaces of the optical insert 1105 and the surfaces 142 and/or 144 can have conformal shapes such that the components provide an equidistant spacing between them. The optical insert 1105 can have a diffusive light output surface 1107 (e.g., a diffusive coating.) Diffusive properties of the light output surface 1107 can be achieved as described herein. The reflector 1309 can be contiguous, have holes, or allow light to transmit through the reflector 1309. In some implementations, the reflector 1309 can be omitted and replaced by a light-transmitting layer. The light-transmitting layer can include a viscous liquid, gel, solid or other light-transmitting materials. In some implementations, the optical insert 1105 can include a fully or partially light-transmissive material, suspended scattering centers, a light conversion material and/or other materials.

In some implementations, where at least portions of the surfaces 142 and 144 of the optical extractor have diffusive properties, a partially reflective coating can be applied to the diffusive surfaces 142 and 144, as shown illustrated above in FIGS. 7A and 10B. Therefore, light output by the optical extractor in the forward direction through surfaces 142 and 144, and light output through light output surfaces 146 and 148 of the optical extractor 140 can be diffuse light.

The preceding figures and accompanying description illustrate example methods, systems and devices for illumination. It will be understood that these methods, systems, and devices are for illustration purposes only and that the described or similar techniques may be performed at any appropriate time, including concurrently, individually, or in combination. In addition, many of the steps in these processes may take place simultaneously, concurrently, and/or in different orders than as shown. Moreover, the described methods/devices may use additional steps/parts, fewer steps/parts, and/or different steps/parts, as long as the methods/devices remain appropriate.

In other words, although this disclosure has been described in terms of certain aspects or implementations and generally associated methods, alterations and permutations of these aspects or implementations will be apparent to those skilled in the art. Accordingly, the above description of example implementations does not define or constrain this disclosure. Further implementations are described in the following claims.

What is claimed is:

1. A luminaire module comprising:
   a plurality of light-emitting elements (LEEs) disposed along a first direction on one or more substrates and adapted to emit light in a forward direction orthogonal to the first direction;
   a light guide elongated along the first direction comprising an input end and an output end, and side surfaces extending from the input end to the output end, the side surfaces shaped to guide light emitted by the one or more LEEs and received at the input end of the light guide in the forward direction to the output end of the light guide and provide guided light at the output end of the light guide;
   an optical extractor elongated along the first direction, the optical extractor being optically coupled with the output end of the light guide and adapted to receive the guided light, the optical extractor having a first redirecting surface, a second redirected surface, a first output surface, and a second output surface,
      the first redirecting surface of the optical extractor being adapted to reflect towards the first output surface a first portion of the light received at the optical extractor in a first direction that has a component orthogonal to the forward direction, wherein the first output surface is adapted to transmit to an ambient environment the light reflected by the first redirecting surface, and
      the second redirecting surface of the optical extractor being adapted to reflect a second portion of the light received at the optical extractor in a second direction that has a component orthogonal to the forward direction and antiparallel to the orthogonal component of the first direction, wherein the second output surface is adapted to transmit to the ambient environment the light reflected by the second redirecting surface, wherein the first and second output surfaces diffuse light; and
   a cap elongated along the first direction, the cap comprising a light-input surface and a diffusive light-output surface,
   wherein the light-input surface of the cap is directly coupled to
      the first redirecting surface through a first adhesive line, and
      the second redirecting surface through a second adhesive line,
   wherein the light-input surface of the cap is adapted to receive light that is transmitted through the first redirecting surface and the second redirecting surface, and
   wherein the diffusive light-output surface of the cap is adapted to transmit to the ambient environment the light received from the first and second redirecting surfaces.

2. The luminaire module of claim 1, wherein the light guide comprises a solid transparent material and the side surfaces are configured to guide the light via TIR.

3. The luminaire module of claim 1, wherein the light guide is hollow and the side surfaces are reflectors configured to guide the light via specular reflection.

4. The luminaire module of claim 1, further comprising one or more couplers positioned to receive a portion of the light emitted by corresponding one or more LEEs and adapted to at least partially collimate the received portion of the light, the one or more couplers being adjacent to the input end of the light guide.

5. The luminaire module of claim 1, wherein at least one of the first redirecting surface, the second redirecting surface, or at least one of the first and second output surfaces comprises a diffusive film.

6. The luminaire module of claim 5, wherein the diffusive film is reflective.

7. The luminaire module of claim 5, wherein the diffusive film is transmissive.

8. A method of fabricating the optical extractor of claim 5, the method comprising disposing the diffusive film on at least one of the first redirecting surface, the second redirecting surface, or at least one of the one or more output surfaces.

9. The luminaire module of claim 1, wherein at least one of the first redirecting surface, the second redirecting surface, or at least one of the first and second output surfaces comprises diffusive structures.

10. The luminaire module of claim 9, wherein the diffusive structures include facets.

11. The luminaire module of claim 9, wherein the diffusive structures include indentations.

12. The luminaire module of claim 9, wherein the diffusive structures include undulating features.

13. The luminaire module of claim 9, wherein the diffusive structures are two dimensional within at least one of the first redirecting surface, the second redirecting surface, or at least one of the first and second output surfaces.

14. A method of fabricating the optical extractor of claim 9, the method comprising:
    providing an optical extractor having smooth surfaces corresponding to at least one of the first redirecting surface, the second redirecting surface, or at least one of the one or more output surfaces; and
    generating the diffusive structures on at least one of the smooth surfaces.

15. The method of claim 14, wherein generating the diffuse structures comprises embossing the diffusive structures.

16. The method of claim 14, wherein generating the diffuse structure comprises molding the diffusive structures.

17. The method of claim 14, wherein generating the diffuse structure comprises imprinting the diffusive structures.

18. The luminaire module of claim 1, wherein the diffusive surfaces have translational symmetry of at least one of the first redirecting surface, the second redirecting surface, or at least one of the first and second output surfaces.

19. The luminaire module of claim 1, wherein at least one of the first redirecting surface, the second redirecting surface, or at least one of the first and second output surfaces further comprises a reflective coating.

20. The luminaire module of claim 1, further comprising one or more reflectors disposed on at least a portion of at least one of the first or the second redirecting surface of the optical extractor.

* * * * *